US012689496B2

(12) United States Patent
Abotabl et al.

(10) Patent No.: US 12,689,496 B2
(45) Date of Patent: Jul. 21, 2026

(54) CAPABILITY REPORTING FOR FULL-DUPLEX WIRELESS COMMUNICATIONS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 18/496,104

(22) Filed: Oct. 27, 2023

(65) Prior Publication Data

US 2025/0141649 A1 May 1, 2025

(51) Int. Cl.
*H04L 5/14* (2006.01)

(52) U.S. Cl.
CPC ..................................... *H04L 5/14* (2013.01)

(58) Field of Classification Search
None
See application file for complete search history.

(56) References Cited

U.S. PATENT DOCUMENTS

2021/0176626 A1*  6/2021  Abdelghaffar ........ H04W 76/27
2025/0267667 A1*  8/2025  Shim ......................... H04L 5/00

OTHER PUBLICATIONS

A. R1-220XXX (Summary #1 of [109-e-R18-Duplex-03] Email discussion on subband non-overlapping full duplex, May 9-20, 2022, CATT). (Year: 2022).*
B. R1-220xxxx (Summary #1 of subband non-overlapping full duplex, France, Aug. 22-26, 2022, CATT). (Year: 2022).*

* cited by examiner

*Primary Examiner* — Maharishi V Khirodhar
(74) *Attorney, Agent, or Firm* — Holland & Hart LLP

(57) ABSTRACT

Methods, systems, and devices for wireless communications are described. A user equipment (UE) may establish a connection with a network entity for operation within a time division duplex (TDD) frequency band. The UE may transmit, to the network entity via the TDD frequency band, capability information that indicates one or more capabilities of the UE associated with operating in a full-duplex mode within the TDD frequency band. The UE may perform, with the network entity, full-duplex communications within the TDD frequency band in accordance with the one or more indicated capabilities. Performing the full-duplex communications within the TDD frequency band may include transmitting first signaling within a first subband of the TDD frequency band concurrent with receiving second signaling within a second subband of the TDD frequency band.

30 Claims, 16 Drawing Sheets 105-a 115-a

205    Indication of Full-Duplex Capability

210    Full-Duplex Communication

215    Downlink Subband

220    Guard Band

225    Uplink Subband

200

115-b 105-b

Establish Connection

405

410

Full-Duplex Capability

Full-Duplex Communications in TDD Band

415

400

130

105

115

Network
Entity

Transceiver

1210

Antenna

1215

Communications
Manager

1220

Memory

Code

1230

1225

1240

Processor

1235

1205

1200

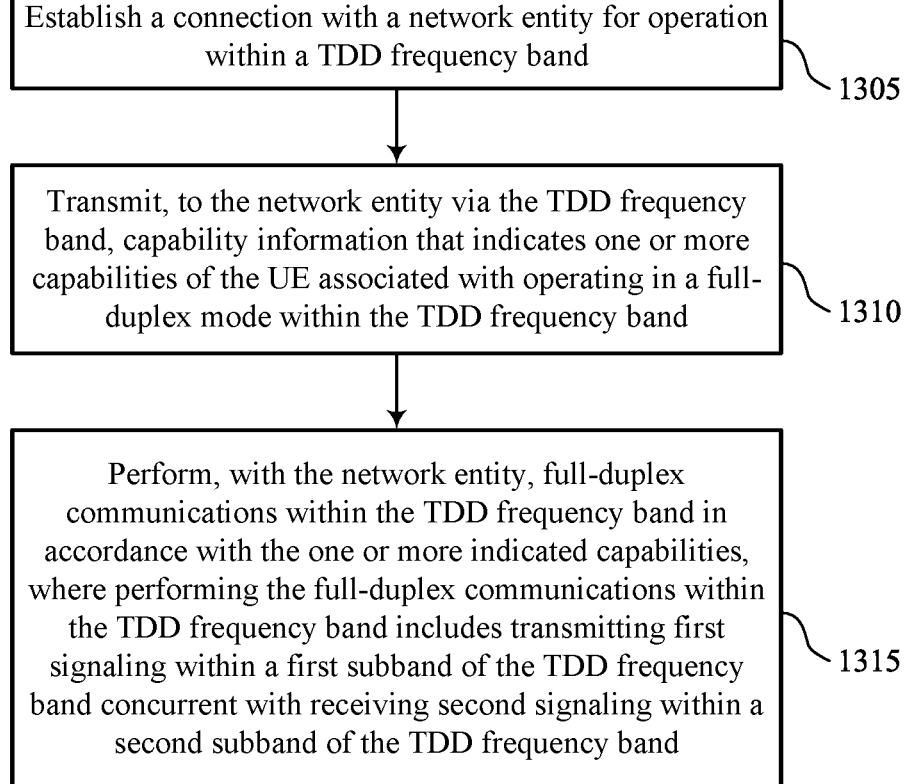

Establish a connection with a network entity for operation within a TDD frequency band

⟍ 1305

Transmit, to the network entity via the TDD frequency band, capability information that indicates one or more capabilities of the UE associated with operating in a full-duplex mode within the TDD frequency band

⟍ 1310

Perform, with the network entity, full-duplex communications within the TDD frequency band in accordance with the one or more indicated capabilities, where performing the full-duplex communications within the TDD frequency band includes transmitting first signaling within a first subband of the TDD frequency band concurrent with receiving second signaling within a second subband of the TDD frequency band

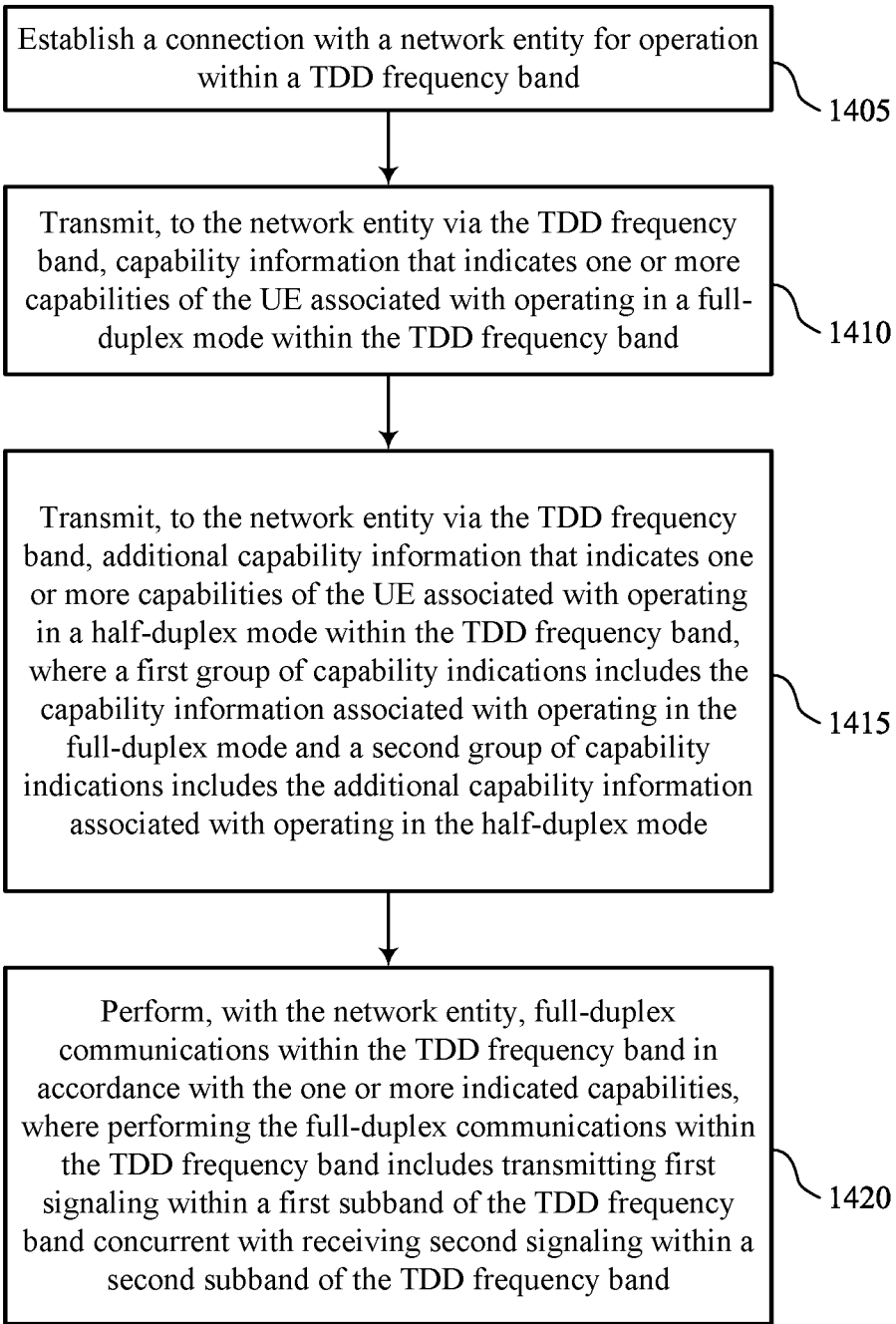

Establish a connection with a network entity for operation within a TDD frequency band

⟍1405

Transmit, to the network entity via the TDD frequency band, capability information that indicates one or more capabilities of the UE associated with operating in a full-duplex mode within the TDD frequency band

⟍1410

Transmit, to the network entity via the TDD frequency band, additional capability information that indicates one or more capabilities of the UE associated with operating in a half-duplex mode within the TDD frequency band, where a first group of capability indications includes the capability information associated with operating in the full-duplex mode and a second group of capability indications includes the additional capability information associated with operating in the half-duplex mode

⟍1415

Perform, with the network entity, full-duplex communications within the TDD frequency band in accordance with the one or more indicated capabilities, where performing the full-duplex communications within the TDD frequency band includes transmitting first signaling within a first subband of the TDD frequency band concurrent with receiving second signaling within a second subband of the TDD frequency band

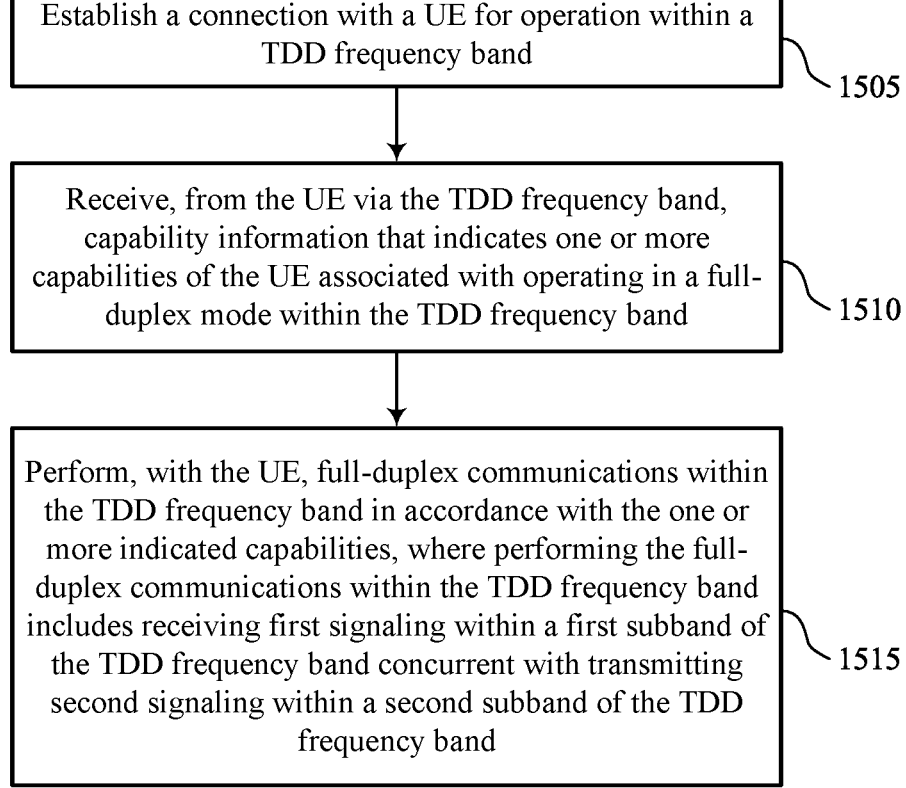

Establish a connection with a UE for operation within a TDD frequency band

~1505

Receive, from the UE via the TDD frequency band, capability information that indicates one or more capabilities of the UE associated with operating in a full-duplex mode within the TDD frequency band

~1510

Perform, with the UE, full-duplex communications within the TDD frequency band in accordance with the one or more indicated capabilities, where performing the full-duplex communications within the TDD frequency band includes receiving first signaling within a first subband of the TDD frequency band concurrent with transmitting second signaling within a second subband of the TDD frequency band

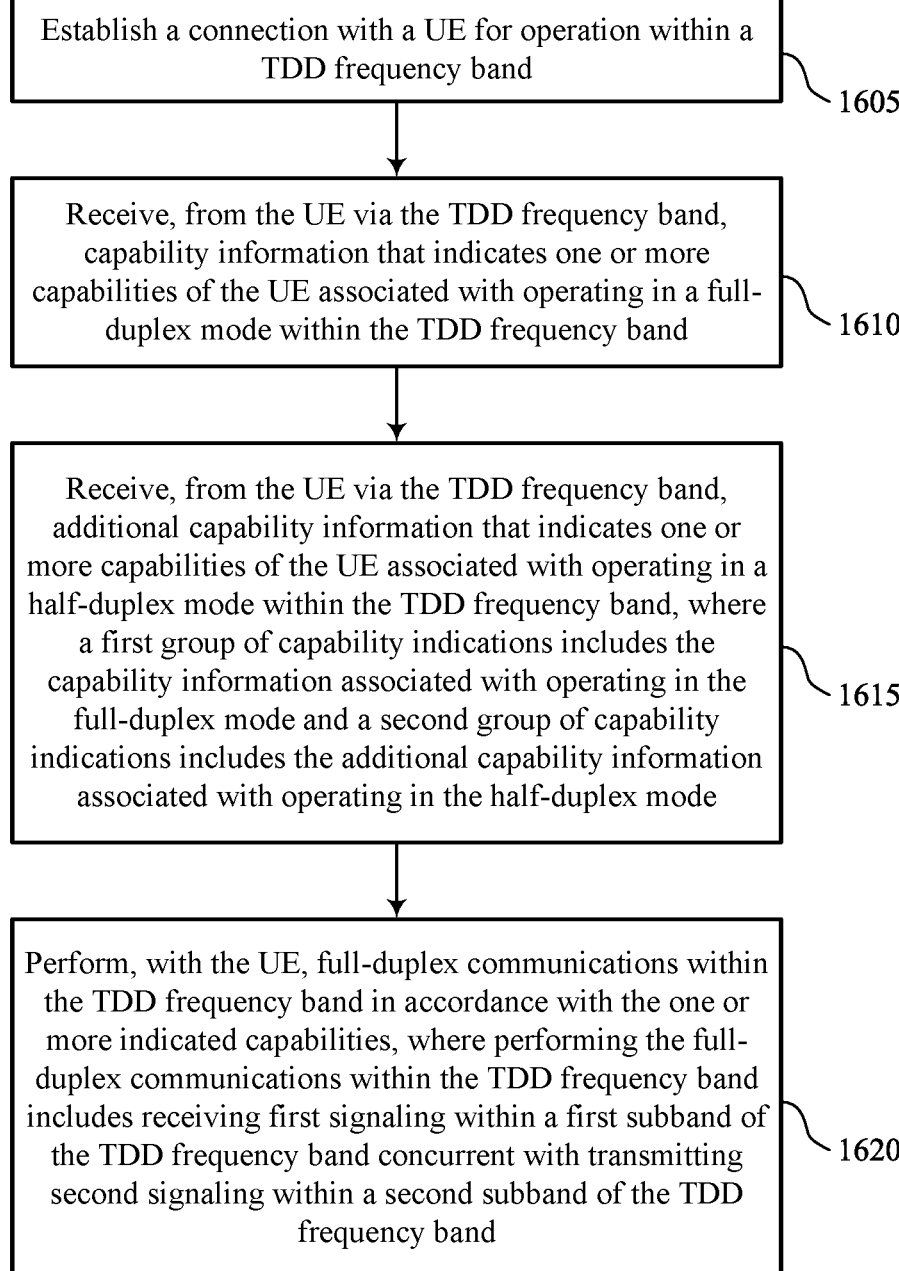

Establish a connection with a UE for operation within a TDD frequency band

1605

Receive, from the UE via the TDD frequency band, capability information that indicates one or more capabilities of the UE associated with operating in a full-duplex mode within the TDD frequency band

1610

Receive, from the UE via the TDD frequency band, additional capability information that indicates one or more capabilities of the UE associated with operating in a half-duplex mode within the TDD frequency band, where a first group of capability indications includes the capability information associated with operating in the full-duplex mode and a second group of capability indications includes the additional capability information associated with operating in the half-duplex mode

1615

Perform, with the UE, full-duplex communications within the TDD frequency band in accordance with the one or more indicated capabilities, where performing the full-duplex communications within the TDD frequency band includes receiving first signaling within a first subband of the TDD frequency band concurrent with transmitting second signaling within a second subband of the TDD frequency band

CAPABILITY REPORTING FOR FULL-DUPLEX WIRELESS COMMUNICATIONS

FIELD OF TECHNOLOGY

The following relates to wireless communications, including capability reporting for full-duplex wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support capability reporting (e.g., by a user equipment (UE)) for full-duplex wireless communications. For example, the described techniques provide options for signaling, to a network entity, one or more full-duplex capabilities of a UE operating in a time division duplex (TDD) frequency band. In some examples, the UE may establish a connection with the network entity for operation in the TDD frequency band. The UE may transmit, to the network entity via the TDD frequency band, capability information that indicates one or more capabilities of the UE associated with operating in a full-duplex mode within the TDD frequency band. The UE and the network entity may perform full-duplex communications within the TDD frequency band in accordance with the one or more indicated capabilities. Performing the full-duplex communications within the TDD frequency band may include the UE transmitting first signaling within a first subband of the TDD frequency band concurrent with receiving second signaling within a second subband of the TDD frequency band.

The full-duplex capabilities may be reported relative to half-duplex capabilities (e.g., the same as or different from the half-duplex capabilities, or a capability reduction relative to a half-duplex capability) or may be reported as an absolute value (e.g., a maximum quantity of multiple-input multiple-output (MIMO) layers for downlink in a full-duplex mode). In some examples, the UE may signal the full-duplex capabilities as part of a same group of capability indications as the half-duplex capabilities, or as a second, separate group of capability indications. The full-duplex capabilities may include one or more of a coherency capability, a quantity of MIMO layers, and a quantity of sounding reference signal (SRS) resources per resource set for uplink, downlink, codebook-based, and non-codebook-based communications. In some examples, the UE may report pairs of respective uplink and downlink capabilities. In some examples, the UE may report one or more full-duplex capabilities in response to detecting a change in the one or more full-duplex capabilities.

A method for wireless communications by a UE is described. The method may include establishing a connection with a network entity for operation within a TDD frequency band, transmitting, to the network entity via the TDD frequency band, capability information that indicates one or more capabilities of the UE associated with operating in a full-duplex mode within the TDD frequency band, and performing, with the network entity, full-duplex communications within the TDD frequency band in accordance with the one or more indicated capabilities, where performing the full-duplex communications within the TDD frequency band includes transmitting first signaling within a first subband of the TDD frequency band concurrent with receiving second signaling within a second subband of the TDD frequency band.

An apparatus for wireless communications at a UE is described. The apparatus may include one or more processors. The apparatus may further include instructions stored in one or more memories and executable by the one or more processors, individually or collectively, to cause the apparatus to establish a connection with a network entity for operation within a TDD frequency band, transmit, to the network entity via the TDD frequency band, capability information that indicates one or more capabilities of the UE associated with operating in a full-duplex mode within the TDD frequency band, and perform, with the network entity, full-duplex communications within the TDD frequency band in accordance with the one or more indicated capabilities, where performing the full-duplex communications within the TDD frequency band includes transmitting first signaling within a first subband of the TDD frequency band concurrent with receiving second signaling within a second subband of the TDD frequency band.

Another apparatus for wireless communications at a UE is described. The apparatus may include means for establishing a connection with a network entity for operation within a TDD frequency band, means for transmitting, to the network entity via the TDD frequency band, capability information that indicates one or more capabilities of the UE associated with operating in a full-duplex mode within the TDD frequency band, and means for performing, with the network entity, full-duplex communications within the TDD frequency band in accordance with the one or more indicated capabilities, where performing the full-duplex communications within the TDD frequency band includes transmitting first signaling within a first subband of the TDD frequency band concurrent with receiving second signaling within a second subband of the TDD frequency band A non-transitory computer-readable medium storing code for wireless communications is described. The code may include instructions executable by a processor to establish a connection with a network entity for operation within a TDD frequency band, transmit, to the network entity via the TDD frequency band, capability information that indicates one or more capabilities of the UE associated with operating in a full-duplex mode within the TDD frequency band, and perform, with the network entity, full-duplex communications within the TDD frequency band in accordance with the one or more indicated capabilities, where performing the full-duplex communications within the TDD frequency band includes transmitting first signaling within a first subband of the TDD frequency band concurrent with receiving second signaling within a second subband of the TDD frequency band.

In some examples of the method, apparatuses, and non-transitory computer-readable medium described herein, to indicate the one or more capabilities of the UE for full-duplex communications, the capability information indicates a coherency capability of the UE for the full-duplex mode, the coherency capability of the UE for the full-duplex mode including whether the UE supports a fully coherent codebook subset, a partially coherent codebook subset, or a non-coherent codebook subset for the full-duplex mode.

In some examples of the method, apparatuses, and non-transitory computer-readable medium described herein, to indicate the coherency capability of the UE for the full-duplex mode, the capability information indicates a relationship between the coherency capability of the UE for the full-duplex mode and a coherency capability of the UE for a half-duplex mode.

In some examples of the method, apparatuses, and non-transitory computer-readable medium described herein, the capability information indicates the coherency capability of the UE for the full-duplex mode independently from a coherency capability of the UE for a half-duplex mode.

In some examples of the method, apparatuses, and non-transitory computer-readable medium described herein, to indicate the one or more capabilities of the UE for full-duplex communications, the capability information indicates a maximum quantity of MIMO layers supported by the UE for codebook-based uplink communications in the full-duplex mode, a maximum quantity of MIMO layers supported by the UE for non-codebook-based uplink communications in the full-duplex mode, a maximum quantity of MIMO layers supported by the UE for downlink communications in the full-duplex mode, or any combination thereof.

In some examples of the method, apparatuses, and non-transitory computer-readable medium described herein, to indicate the one or more capabilities of the UE for full-duplex communications, the capability information indicates a maximum quantity of SRS resources per SRS resource set supported by the UE in the full-duplex mode, a maximum quantity of SRS resources for concurrent SRS transmission by the UE in the full-duplex mode, or any combination thereof.

Some examples of the method, apparatuses, and non-transitory computer-readable medium described herein may further include operations, features, means, or instructions for transmitting, to the network entity via the TDD frequency band, additional capability information that indicates one or more capabilities of the UE associated with operating in a half-duplex mode within the TDD frequency band, where a first group of capability indications includes the capability information associated with operating in the full-duplex mode and a second group of capability indications includes the additional capability information associated with operating in the half-duplex mode.

Some examples of the method, apparatuses, and non-transitory computer-readable medium described herein may further include operations, features, means, or instructions for transmitting, to the network entity via the TDD frequency band, additional capability information that indicates one or more capabilities of the UE associated with operating in a half-duplex mode within the TDD frequency band, where a same group of capability indications includes the capability information associated with operating in the full-duplex mode and the additional capability information associated with operating in the half-duplex mode.

In some examples of the method, apparatuses, and non-transitory computer-readable medium described herein, the group of capability indications is operable to indicate a single value for a capability included in the one or more capabilities of the UE when the capability is identical for the full-duplex mode and the half-duplex mode.

In some examples of the method, apparatuses, and non-transitory computer-readable medium described herein, the group of capability indications is operable to indicate two values for a capability included in the one or more capabilities of the UE when the capability is different for the full-duplex mode than the half-duplex mode.

In some examples of the method, apparatuses, and non-transitory computer-readable medium described herein, the capability information indicates multiple pairs of downlink and uplink capabilities associated with operating in the full-duplex mode, the multiple pairs corresponding to different operating conditions for the UE, each pair of the multiple pairs including a respective downlink capability for the UE and a respective uplink capability for the UE associated with a respective operating condition for the UE.

In some examples of the method, apparatuses, and non-transitory computer-readable medium described herein, the capability information indicates, from among the multiple pairs, one pair as a default pair of downlink and uplink capabilities associated with operating in the full-duplex mode.

In some examples of the method, apparatuses, and non-transitory computer-readable medium described herein, the capability information indicates a first pair of downlink and uplink capabilities associated with operating in the full-duplex mode, the first pair including a first downlink capability for the UE and a first uplink capability for the UE. Some examples of the method, apparatuses, and non-transitory computer-readable medium described herein may further include operations, features, means, or instructions for transmitting, based on detecting a change in capability for the UE, updated capability information that indicates a second pair of downlink and uplink capabilities associated with operating in the full-duplex mode, the second pair including a second downlink capability for the UE, a second uplink capability for the UE, or both.

In some examples of the method, apparatuses, and non-transitory computer-readable medium described herein, where the one or more capabilities of the UE associated with operating in a full-duplex mode are applicable to an entire serving cell.

In some examples of the method, apparatuses, and non-transitory computer-readable medium described herein, the one or more capabilities of the UE associated with operating in a full-duplex mode are specific to a respective bandwidth part.

In some examples of the method, apparatuses, and non-transitory computer-readable medium described herein, to indicate a capability included in the one or more capabilities of the UE for full-duplex communications, the capability information indicates a difference between the capability of the UE for full-duplex communications relative to a corresponding capability of the UE for half-duplex communications.

In some examples of the method, apparatuses, and non-transitory computer-readable medium described herein, to indicate a capability included in the one or more capabilities of the UE for full-duplex communications, the capability information indicates a first difference between an uplink capability of the UE for full-duplex communications relative to a corresponding uplink capability of the UE for half-duplex communications and further indicates a second difference between a downlink capability of the UE for full-duplex communications relative to a corresponding downlink capability of the UE for half-duplex communications.

In some examples of the method, apparatuses, and non-transitory computer-readable medium described herein, to indicate the one or more capabilities of the UE for full-duplex communications, the capability information indicates a quantity of antenna panels of the UE that are available for full-duplex communications.

In some examples of the method, apparatuses, and non-transitory computer-readable medium described herein, to indicate the one or more capabilities of the UE for full-duplex communications, the capability information indicates a quantity of antenna panels available for transmission in the full-duplex mode, a quantity of antenna panels available for reception in the full-duplex mode, a respective quantity of transmission chains available for each antenna panel included in the quantity of antenna panels, a respective quantity of reception chains available for each antenna panel included in the quantity of antenna panels, or any combination thereof.

In some examples of the method, apparatuses, and non-transitory computer-readable medium described herein, to indicate the one or more capabilities of the UE for full-duplex communications, the capability information indicates whether a spatial division multiplexing scheme associated with a half-duplex mode is supported by the UE for the full-duplex mode.

A method for wireless communications by a network entity is described. The method may include establishing a connection with a UE for operation within a TDD frequency band, receiving, from the UE via the TDD frequency band, capability information that indicates one or more capabilities of the UE associated with operating in a full-duplex mode within the TDD frequency band, and performing, with the UE, full-duplex communications within the TDD frequency band in accordance with the one or more indicated capabilities, where performing the full-duplex communications within the TDD frequency band includes receiving first signaling within a first subband of the TDD frequency band concurrent with transmitting second signaling within a second subband of the TDD frequency band.

An apparatus for wireless communications at a network entity is described. The apparatus may include one or more processors. The apparatus may further include instructions stored in one or more memories and executable by the one or more processors, individually or collectively, to cause the apparatus to establish a connection with a UE for operation within a TDD frequency band, receive, from the UE via the TDD frequency band, capability information that indicates one or more capabilities of the UE associated with operating in a full-duplex mode within the TDD frequency band, and perform, with the UE, full-duplex communications within the TDD frequency band in accordance with the one or more indicated capabilities, where performing the full-duplex communications within the TDD frequency band includes receiving first signaling within a first subband of the TDD frequency band concurrent with transmitting second signaling within a second subband of the TDD frequency band.

Another apparatus for wireless communications at a network entity is described. The apparatus may include means for establishing a connection with a UE for operation within a TDD frequency band, means for receiving, from the UE via the TDD frequency band, capability information that indicates one or more capabilities of the UE associated with operating in a full-duplex mode within the TDD frequency band, and means for performing, with the UE, full-duplex communications within the TDD frequency band in accordance with the one or more indicated capabilities, where performing the full-duplex communications within the TDD frequency band includes receiving first signaling within a first subband of the TDD frequency band concurrent with transmitting second signaling within a second subband of the TDD frequency band.

A non-transitory computer-readable medium storing code for wireless communications is described. The code may include instructions executable by a processor to establish a connection with a UE for operation within a TDD frequency band, receive, from the UE via the TDD frequency band, capability information that indicates one or more capabilities of the UE associated with operating in a full-duplex mode within the TDD frequency band, and perform, with the UE, full-duplex communications within the TDD frequency band in accordance with the one or more indicated capabilities, where performing the full-duplex communications within the TDD frequency band includes receiving first signaling within a first subband of the TDD frequency band concurrent with transmitting second signaling within a second subband of the TDD frequency band.

In some examples of the method, apparatuses, and non-transitory computer-readable medium described herein, to indicate the one or more capabilities of the UE for full-duplex communications, the capability information indicates a coherency capability of the UE for the full-duplex mode, the coherency capability of the UE for the full-duplex mode including whether the UE supports a fully coherent codebook subset, a partially coherent codebook subset, or a non-coherent codebook subset for the full-duplex mode.

In some examples of the method, apparatuses, and non-transitory computer-readable medium described herein, to indicate the coherency capability of the UE for the full-duplex mode, the capability information indicates a relationship between the coherency capability of the UE for the full-duplex mode and a coherency capability of the UE for a half-duplex mode.

In some examples of the method, apparatuses, and non-transitory computer-readable medium described herein, the capability information indicates the coherency capability of the UE for the full-duplex mode independently from a coherency capability of the UE for a half-duplex mode.

In some examples of the method, apparatuses, and non-transitory computer-readable medium described herein, to indicate the one or more capabilities of the UE for full-duplex communications, the capability information indicates a maximum quantity of MIMO layers supported by the UE for codebook-based uplink communications in the full-duplex mode, a maximum quantity of MIMO layers supported by the UE for non-codebook-based uplink communications in the full-duplex mode, a maximum quantity of MIMO layers supported by the UE for downlink communications in the full-duplex mode, or any combination thereof.

In some examples of the method, apparatuses, and non-transitory computer-readable medium described herein, to indicate the one or more capabilities of the UE for full-duplex communications, the capability information indicates a maximum quantity of SRS resources per SRS resource set supported by the UE in the full-duplex mode, a maximum quantity of SRS resources for concurrent SRS transmission by the UE in the full-duplex mode, or any combination thereof.

Some examples of the method, apparatuses, and non-transitory computer-readable medium described herein may further include operations, features, means, or instructions for receiving, from the UE via the TDD frequency band, additional capability information that indicates one or more capabilities of the UE associated with operating in a half-duplex mode within the TDD frequency band, where a first group of capability indications includes the capability information associated with operating in the full-duplex mode and a second group of capability indications includes the additional capability information associated with operating in the half-duplex mode.

Some examples of the method, apparatuses, and non-transitory computer-readable medium described herein may further include operations, features, means, or instructions for receiving, from the UE via the TDD frequency band, additional capability information that indicates one or more capabilities of the UE associated with operating in a half-duplex mode within the TDD frequency band, where a same group of capability indications includes the capability information associated with operating in the full-duplex mode and the additional capability information associated with operating in the half-duplex mode.

In some examples of the method, apparatuses, and non-transitory computer-readable medium described herein, the group of capability indications is operable to indicate a single value for a capability included in the one or more capabilities of the UE when the capability is identical for the full-duplex mode and the half-duplex mode.

In some examples of the method, apparatuses, and non-transitory computer-readable medium described herein, the group of capability indications is operable to indicate two values for a capability included in the one or more capabilities of the UE when the capability is different for the full-duplex mode than the half-duplex mode.

In some examples of the method, apparatuses, and non-transitory computer-readable medium described herein, the capability information indicates multiple pairs of downlink and uplink capabilities associated with operating in the full-duplex mode, the multiple pairs corresponding to different operating conditions for the UE, each pair of the multiple pairs including a respective downlink capability for the UE and a respective uplink capability for the UE associated with a respective operating condition for the UE.

In some examples of the method, apparatuses, and non-transitory computer-readable medium described herein, the capability information indicates, from among the multiple pairs, one pair as a default pair of downlink and uplink capabilities associated with operating in the full-duplex mode.

In some examples of the method, apparatuses, and non-transitory computer-readable medium described herein, the capability information indicates a first pair of downlink and uplink capabilities associated with operating in the full-duplex mode, the first pair including a first downlink capability for the UE and a first uplink capability for the UE. Some examples of the method, apparatuses, and non-transitory computer-readable medium described herein may further include operations, features, means, or instructions for receiving, based on a change in capability for the UE, updated capability information that indicates a second pair of downlink and uplink capabilities associated with operating in the full-duplex mode, the second pair including a second downlink capability for the UE, a second uplink capability for the UE, or both.

In some examples of the method, apparatuses, and non-transitory computer-readable medium described herein, where the one or more capabilities of the UE associated with operating in a full-duplex mode are applicable to an entire serving cell.

In some examples of the method, apparatuses, and non-transitory computer-readable medium described herein, the one or more capabilities of the UE associated with operating in a full-duplex mode are specific to a respective bandwidth part.

In some examples of the method, apparatuses, and non-transitory computer-readable medium described herein, to indicate a capability included in the one or more capabilities of the UE for full-duplex communications, the capability information indicates a difference between the capability of the UE for full-duplex communications relative to a corresponding capability of the UE for half-duplex communications.

In some examples of the method, apparatuses, and non-transitory computer-readable medium described herein, to indicate a capability included in the one or more capabilities of the UE for full-duplex communications, the capability information indicates a first difference between an uplink capability of the UE for full-duplex communications relative to a corresponding uplink capability of the UE for half-duplex communications and further indicates a second difference between a downlink capability of the UE for full-duplex communications relative to a corresponding downlink capability of the UE for half-duplex communications.

In some examples of the method, apparatuses, and non-transitory computer-readable medium described herein, to indicate the one or more capabilities of the UE for full-duplex communications, the capability information indicates a quantity of antenna panels of the UE that are available for full-duplex communications.

In some examples of the method, apparatuses, and non-transitory computer-readable medium described herein, to indicate the one or more capabilities of the UE for full-duplex communications, the capability information indicates a quantity of antenna panels available for transmission in the full-duplex mode, a quantity of antenna panels available for reception in the full-duplex mode, a respective quantity of transmission chains available for each antenna panel included in the quantity of antenna panels, a respective quantity of reception chains available for each antenna panel included in the quantity of antenna panels, or any combination thereof.

In some examples of the method, apparatuses, and non-transitory computer-readable medium described herein, to indicate the one or more capabilities of the UE for full-duplex communications, the capability information indicates whether a spatial division multiplexing scheme associated with a half-duplex mode is supported by the UE for the full-duplex mode.

BRIEF DESCRIPTION OF THE DRAWINGS

FIGS. 13 through 16 show flowcharts illustrating methods that support capability reporting for full-duplex wireless communications in accordance with one or more aspects of the present disclosure.

DETAILED DESCRIPTION

Figure 1:
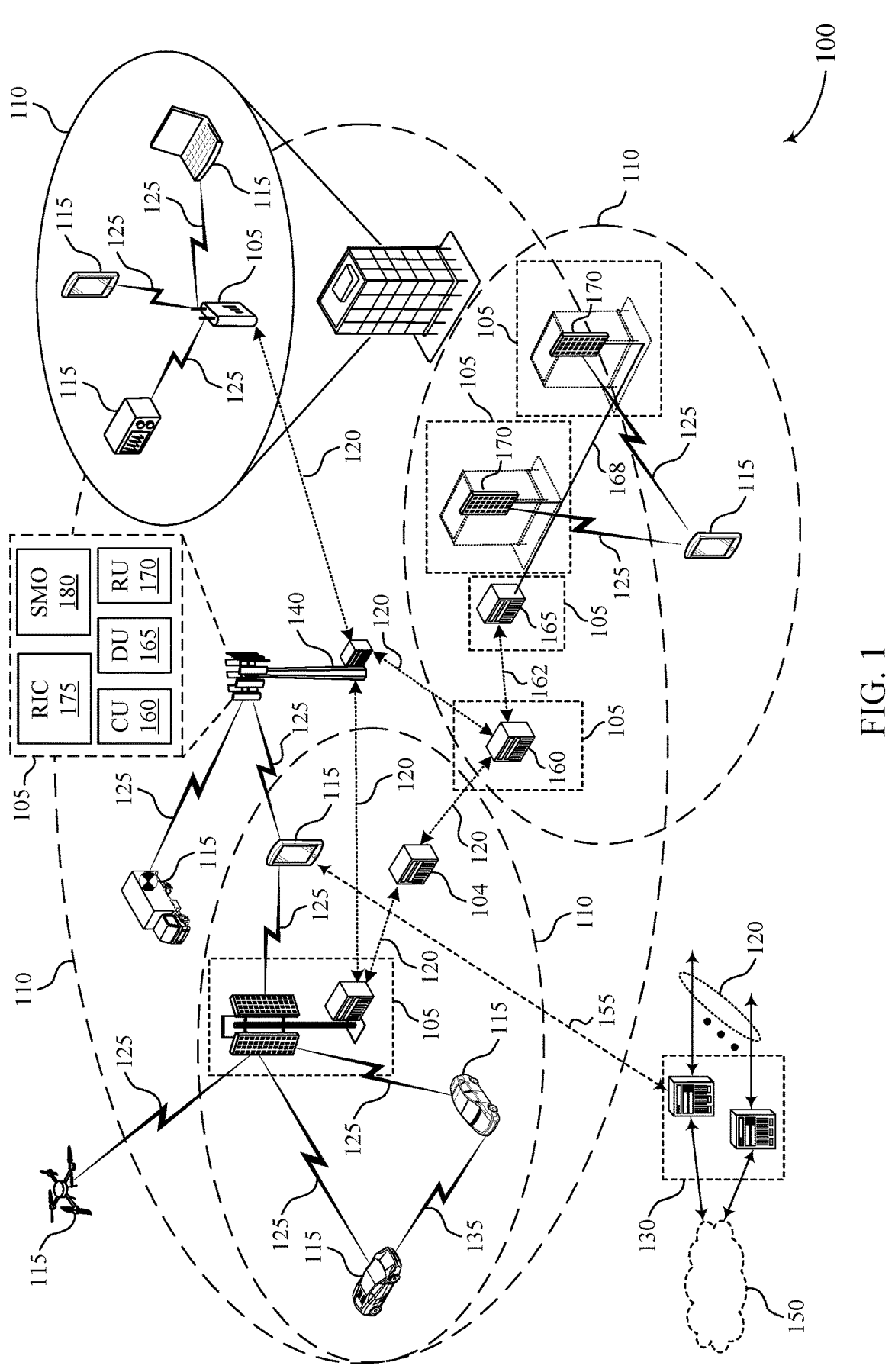
FIG. 1 shows an example of a wireless communications system that supports capability reporting for full-duplex wireless communications in accordance with one or more aspects of the present disclosure.

A wireless communications system may support communications in one or more frequency bands. In some systems, capability reporting (e.g., reporting by a user equipment (UE) of one or more communications capabilities) may be performed on a per-band basis. Thus, for example, in a frequency band that is configured for half-duplex communications, a UE may report its capabilities related to half-duplex communications but not its capabilities related to full-duplex communications.

Some wireless communications systems may support communications in a time division duplex (TDD) frequency band, which may support half-duplex communications. For example, a first slot in the TDD frequency band may be used for uplink communications and a second slot in the TDD frequency band may be used for downlink communications. However, some wireless communications systems may support both half-duplex and full-duplex communications within a time division duplex (TDD) frequency band, such as by allowing some slots within the TDD band to be half-duplex slots (as described above) while also allowing some other slots within the TDD band to be full-duplex slots. For example, a third slot in the TDD frequency band may be a full-duplex slot (e.g., a subband full-duplex (SBFD) slot) in which a first subband is used for uplink communications and a second subband is used for downlink communications. Thus, a UE may operate in a half-duplex mode in a first set of one or more slots in a TDD frequency band and may operate in a full-duplex mode in a second set of one or more slots in the TDD frequency band. The capabilities of the UE may be different for operations in the half-duplex mode and the full-duplex mode. Therefore, signaling may be desired to inform the network of both half-duplex capabilities and full-duplex capabilities when the UE operates in a full-duplex mode in a TDD frequency band.

The techniques described herein provide options for the UE to report its full-duplex capabilities to the network entity, including when the UE is operating in a TDD frequency band (e.g., a frequency band that supports time division duplex communications during at least some transmission time intervals (TTIs), such as a frequency band in which at least some slots are half-duplex slots in which one direction of communications occurs at a time and other slots are full-duplex slots that include at least some time periods of full-duplex communications). Although examples may be described herein with reference to TTD frequency bands, the techniques applied herein may also be used to support full-duplex capability reporting in any type of frequency band. The full-duplex capabilities may be reported relative to half-duplex capabilities (e.g., the same as or different from the half-duplex capabilities, or a reduced capability relative to a half-duplex capability) or may be reported as an absolute value (e.g., a maximum quantity of multiple-input multiple-output (MIMO) layers for downlink in a full-duplex mode). In some examples, the UE may signal the full-duplex capabilities as part of a same group of capability indications as the half-duplex capabilities, or as a second, separate group of capability indications. The full-duplex capabilities may include one or more of a coherency capability, a quantity of MIMO layers, and a quantity of sounding reference signal (SRS) resources per resource set for uplink, downlink, codebook-based, and non-codebook-based communications. In some examples, the UE may report pairs of respective uplink and downlink capabilities. In some examples, the UE may report one or more full-duplex capabilities in response to detecting a change in the one or more full-duplex capabilities.

The techniques described herein may improve communication reliability, reduce latency, and improve user experience related to reduced processing. For example, signaling options for communicating a full-duplex capability of the UE for operation in a TDD frequency band may provide for more efficient utilization of communication resources and improved coordination between devices.

Aspects of the disclosure are initially described in the context of wireless communications systems. Aspects of the disclosure are then described in the context of a resource diagram and a process flow. Aspects of the disclosure are further illustrated by and described with reference to apparatus diagrams, system diagrams, and flowcharts that relate to capability reporting for full-duplex wireless communications.

FIG. 1 shows an example of a wireless communications system 100 that supports capability reporting for full-duplex wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support capability reporting for full-duplex wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/$ $(\Delta f_{max} \cdot N_f)$ seconds, for which $\Delta f_{max}$ may represent a supported subcarrier spacing, and Ne may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, MIMO communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may support communications in a frequency band, in which a UE 115 and a network entity 105 may perform both uplink and downlink communications within the same frequency band. In some examples, the frequency band may be a TDD frequency band. For example, a first slot in the TDD frequency band may be used for uplink communications and a second slot in the TDD frequency band may be used for downlink communications. The wireless communications system 100 may also support both half-duplex and full-duplex communications between the network entity 105 and the UE 115. For example, a third slot in the TDD frequency band may be a full-duplex slot (e.g., an SBFD slot) in which a first subband in the full-duplex slot is used for uplink communications and a second subband in the full-duplex slot is used for downlink communications.

The UE 115 may report one or more half-duplex capabilities (e.g., a coherency capability, a quantity of MIMO layers, and a quantity of SRS resources per resource set for uplink, downlink, codebook-based, and non-codebook-based communications) to the network entity 105. In some examples, however, the UE 115 may operate in a half-duplex mode in a first set of one or more slots in a TDD frequency band and may operate in a full-duplex mode in a second set of one or more slots in the TDD frequency band. The capabilities of the UE 115 may be different for operations in the half-duplex mode and the full-duplex mode. Therefore, signaling may be desired to inform the network entity 105 of both half-duplex capabilities and full-duplex capabilities when the UE 115 operates in a full-duplex mode in a TDD frequency band.

The techniques described herein provide options for the UE 115 to report its full-duplex capabilities to the network entity 105. The full-duplex capabilities may be reported relative to half-duplex capabilities (e.g., the same as or different from the half-duplex capabilities, or a reduced capability relative to a half-duplex capability) or may be reported as an absolute value (e.g., a maximum quantity of MIMO layers for downlink in a full-duplex mode). In some examples, the UE 115 may signal the full-duplex capabilities as part of a same group of capability indications as the half-duplex capabilities, or as a second, separate group of capability indications. The full-duplex capabilities may include one or more of a coherency capability, a quantity of MIMO layers, and a quantity of SRS resources per resource set for uplink, downlink, codebook-based, and non-codebook-based communications. In some examples, the UE 115 may report pairs of respective uplink and downlink capabilities. In some examples, the UE 115 may report one or more full-duplex capabilities in response to detecting a change in the one or more full-duplex capabilities.

Figure 2:
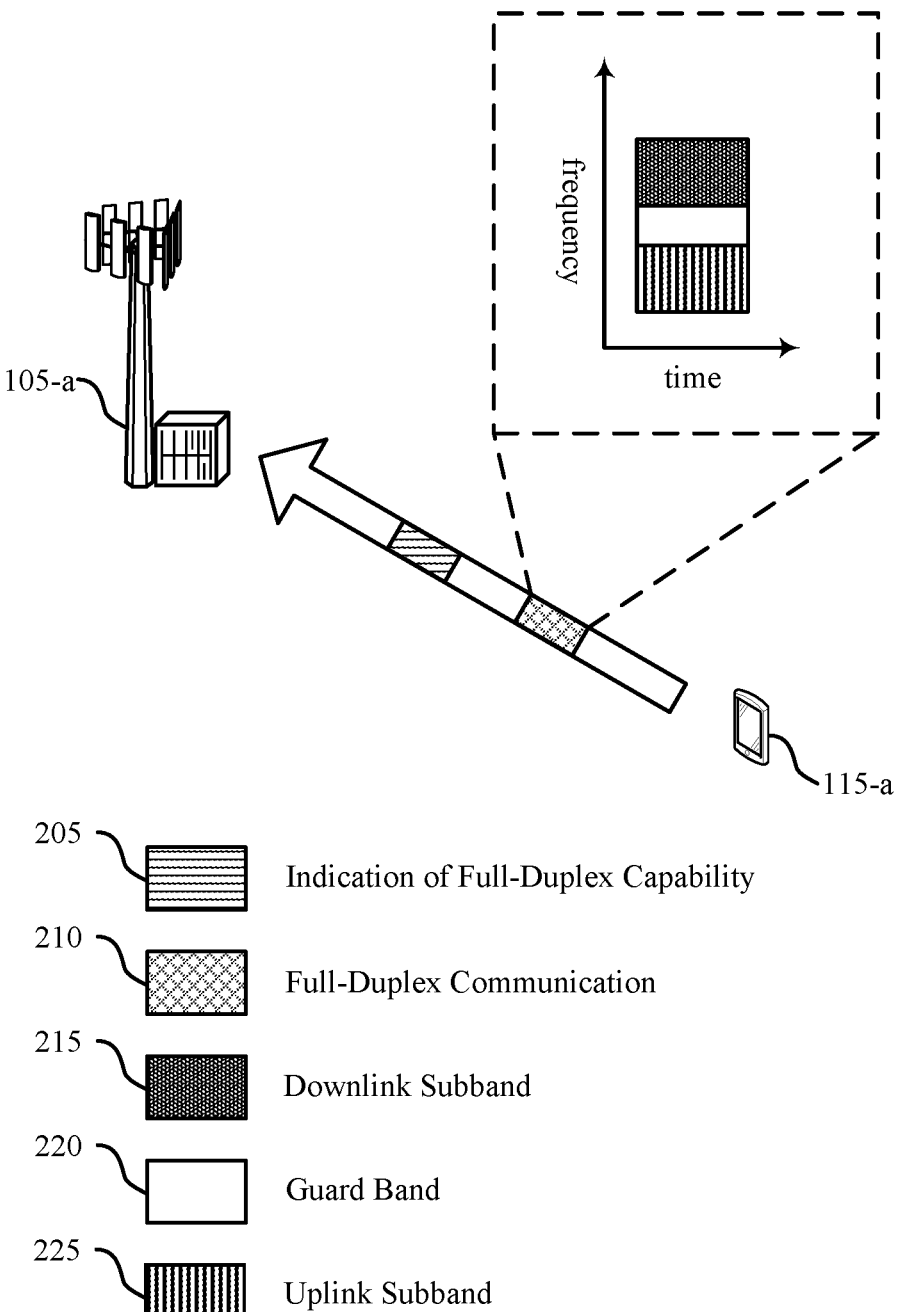
FIG. 2 shows an example of a wireless communications system that supports capability reporting for full-duplex wireless communications in accordance with one or more aspects of the present disclosure.

FIG. 2 shows an example of a wireless communications system 200 that supports capability reporting for full-duplex wireless communications in accordance with one or more aspects of the present disclosure. The wireless communications system 200 may implement or be implemented to realize aspects of the wireless communications system 100. For example, the wireless communications system 200 may illustrate communication between a UE 115-*a* and a network entity 105-*a*, which may be examples of corresponding devices described herein, including with reference to FIG. 1. In some examples, the UE 115-*a* may establish a connection with the network entity 105-*a*, transmit a full-duplex capability of the UE 115-*a*, and communicate with the network entity 105-*a* in accordance with the transmitted full-duplex capability.

For example, the wireless communications system 200 may support communications in a TDD frequency band, in which the UE 115-*a* and the network entity 105-*a* may perform both uplink and downlink communications within the same TDD frequency band. For example, with reference to FIG. 3, a first slot (e.g., the downlink half-duplex slot 310) in the TDD frequency band 305 may be used for downlink communications (e.g., half-duplex downlink communications) and a second slot (e.g., the uplink half-duplex slot 320) in the TDD frequency band 305 may be used for uplink communications (e.g., half-duplex uplink communications). The wireless communications system 200 may also support both half-duplex and full-duplex communications between the network entity 105-*a* and the UE 115-*a*. For example, a third slot (e.g., the full-duplex slot 315) in the TDD frequency band 305 may be a full-duplex slot (e.g., an SBFD slot, or a flexible duplex slot) in which a first subband in the full-duplex slot is used for uplink communications and a second subband in the full-duplex slot is used for downlink communications. For example, as shown in FIG. 2, the UE 115-*a* may receive downlink messages in the downlink subband 215 of the TDD frequency band at a time at least partially overlapping with a time at which the UE 115-*a* may transmit messages in the uplink subband 225 of the TDD frequency band. The downlink subband 215 and the uplink subband 225 may be separated in the frequency domain by a guard band 220.

The UE 115-*a* may include one or more knobs to enable SBFD operation. For example, the UE 115-*a* may improve spatial isolation of uplink and downlink signals (e.g., preventing or minimizing self-interference at the UE 115-*a*) by separating transmission antennas (e.g., transmitting antenna panels) from reception antennas (e.g., receiving antenna panels), or by using an enhanced circulator or duplexer design with a single shared antenna. In some examples, the UE 115-*a* may improve frequency isolation of uplink and downlink signals by employing a transmission or reception analog filter, such as a duplexer. In some implementations, the UE 115-*a* may improve its full-duplex capabilities by using an analog interference canceller, a reception filter, a digital non-linear interference canceller (e.g., kernel generation from transmission samples or feedback reception to capture post-power amplifier non-linearity), or any combination thereof.

The UE 115-*a* may perform capability reporting per band, and may report a half-duplex capability and refrain from reporting a full-duplex capability for operation in a typical TDD frequency band. For example, the UE 115-*a* may report one or more half-duplex capabilities (e.g., a coherency capability, a quantity of MIMO layers, and a quantity of SRS resources per resource set for uplink, downlink, codebook-based, and non-codebook-based communications in a half-duplex mode) to the network entity 105-*a*.

In some examples, however, the UE 115-*a* may operate in a half-duplex mode in a first set of one or more slots in a TDD frequency band and may operate in a full-duplex mode in a second set of one or more slots in the TDD frequency band. The capabilities of the UE 115-*a* may be different for operations in the half-duplex mode and the full-duplex mode. For example, the coherency assumption may be change from a half-duplex mode to a full-duplex mode, or the quantity of antennas may be different. In such examples, signaling may be desired to inform the network entity 105-*a* of both half-duplex capabilities and full-duplex capabilities when the UE 115-*a* operates in a full-duplex mode in a TDD frequency band.

In some implementations, the network entity 105-*a* and the UE 115-*a* may establish a connection. The wireless communications system 200 may support both a half-duplex mode and a full-duplex mode for operation in a TDD frequency band. The UE 115-*a* may transmit, to the network entity 105-*a*, an indication of full-duplex capability 205 indicating that the UE 115-*a* is capable of operating in a full-duplex mode. Additionally, or alternatively, the indication of full-duplex capability 205 may indicate one or more capabilities of the UE 115-*a* associated with operating in the full-duplex mode within the TDD frequency band. The UE 115-*a* and the network entity 105-*a* may perform full-duplex communications 210 in accordance with the one or more capabilities indicated by the indication of full-duplex capability 205.

The present disclosure describes various options for the one or more capabilities indicated by the indication of full-duplex capability 205. For example, the one or more capabilities may indicate a coherency capability of the UE 115-*a* for the full-duplex mode (e.g., a physical uplink shared channel (PUSCH) codebook coherency subset). The coherency capability of the UE 115-*a* for the full-duplex mode may include whether the UE 115-*a* supports a fully coherent codebook subset, a partially coherent codebook subset, or a non-coherent codebook subset for the full-duplex mode. A UE 115 that supports the fully coherent codebook subset may also support the partially coherent codebook subset and the non-coherent subset, and a UE 115 that supports the partially coherent codebook subset may also support the non-coherent codebook subset. If the UE 115-*a* supports a fully coherent codebook subset, each of the antennas of the UE 115-*a* may operate with the same phase. Similarly, if the UE 115-*a* supports non-coherent codebook subset, each of the antennas of the UE 115-*a* may operate with a different phase. If the UE 115-*a* supports a partially coherent codebook subset, a first subset of the antennas of the UE 115-a may operate with the same phase while a second subset of the antennas of the UE 115-a may operate with a different phase.

In some examples, the one or more capabilities indicated by the indication of full-duplex capability 205 may indicate a relationship between the coherency capability of the UE 115-a for the full-duplex mode and a coherency capability of the UE 115-a for a half-duplex mode. For example, the indication of full-duplex capability 205 may indicate that the coherency capability in the full-duplex mode may be the same as the coherency capability in the half-duplex mode. Additionally, or alternatively, the UE 115-a may refrain from transmitting an indication of the coherency capability of the UE 115-a for the full-duplex mode. For example, if the UE 115-a has indicated, to the network entity 105-a, that the coherency capability for the half-duplex mode is non-coherent, the UE 115-1 may refrain from transmitting a coherency capability for the full-duplex mode and the network entity may assume that the coherency capability for the full-duplex mode is also non-coherent. In some examples, the capability information may indicate the coherency capability of the UE 115-a for the full-duplex mode independently from the coherency capability of the UE 115-a for a half-duplex mode. That is, the UE 115-a may transmit an absolute coherency capability of the UE 115-a for the full-duplex mode rather than a coherency capability relative to the coherency capability of the UE 115-a for the half-duplex mode. For example, the UE 115-a may indicate, to the network entity 105-a, that the coherency capability of the UE 115-a for the half-duplex mode includes four transmission antennas that are partially coherent and may separately indicate that the coherency capability of the UE 115-a for the full-duplex mode includes two transmission antennas that are fully coherent.

In some examples, the network entity 105-a may assume that the coherency capability of the UE 115-a for a full-duplex mode is non-coherent. This is a safe assumption since, for example, the network entity 105-a may not have information regarding which antennas in a partially coherent arrangement have the same phase and which antennas have a different phase. In some cases, the coherency capability of the UE 115-a may change due to a cascaded architecture and power amplifier power backoff.

In some examples, the one or more capabilities indicated by the indication of full-duplex capability 205 may indicate a maximum quantity of MIMO layers supported by the UE 115-a for codebook-based uplink communications in the full-duplex mode, a maximum quantity of MIMO layers supported by the UE 115-a for non-codebook-based uplink communications in the full-duplex mode, a maximum quantity of MIMO layers supported by the UE 115-a for downlink communications in the full-duplex mode, or any combination thereof.

In some examples, the one or more capabilities indicated by the indication of full-duplex capability 205 may indicate a maximum quantity of SRS resources per SRS resource set supported by the UE 115-a in the full-duplex mode, a maximum quantity of SRS resources for concurrent SRS transmission by the UE 115-b in the full-duplex mode, or any combination thereof.

In some examples, the UE 115-a may transmit, to the network entity 105-a via the TDD frequency band, additional capability information that indicates one or more capabilities of the UE 115-a associated with operating in a half-duplex mode within the TDD frequency band. That is, a first group of capability indications may include the capability information associated with operating in the full-duplex mode and a second group of capability indications may include the additional capability information associated with operating in the half-duplex mode. Additionally, or alternatively, the UE 115-a may transmit, to the network entity 105-a via the TDD frequency band, additional capability information that indicates one or more capabilities of the UE 115-a associated with operating in a half-duplex mode within the TDD frequency band, where a same group of capability indications includes the capability information associated with operating in the full-duplex mode and the additional capability information associated with operating in the half-duplex mode.

In some examples, the group of capability indications may indicate a single value for a capability included in the one or more capabilities of the UE 115-a when the capability is identical for the full-duplex mode and the half-duplex mode. For example, the UE 115-a may indicate, to the network entity 105-a, a single value for a quantity of MIMO layers for uplink communications, and the network entity 105-a may assume that the UE 115-a supports that quantity of MIMO layers for uplink communications while operating in the half-duplex mode and while operating in the full-duplex mode. Additionally, or alternatively, the group of capability indications may indicate two values for a capability included in the one or more capabilities of the UE 115-a when the capability is different for the full-duplex mode than the half-duplex mode. For example, the UE 115-a may indicate, to the network entity 105-a, a first value indicating a quantity of MIMO layers for uplink communications while operating in the half-duplex mode and a second value indicating a quantity of MIMO layers for uplink communications while operating in the full-duplex mode.

While operating in the half-duplex mode, the UE 115-a may operate in either downlink or uplink. Thus, the capabilities of the UE 115 in uplink and downlink may be clear and independent while the UE 115-a operates in the half-duplex mode (e.g., when each of the slots in the TDD frequency band operates in the half-duplex mode). However, when the UE 115-a switches to a full-duplex mode (e.g., a first slot in the TDD frequency band operates in the half-duplex mode and a second slot in the TDD frequency band operates in the full-duplex mode), increased capabilities in uplink may decrease capabilities for downlink. The network entity 105-a may be unaware of which capability (e.g., the uplink capability or the downlink capability) may be reported.

In some implementations, the one or more capabilities indicated by the indication of full-duplex capability 205 may indicate multiple pairs of downlink and uplink capabilities associated with operating in the full-duplex mode. The multiple pairs may correspond to different operating conditions for the UE 115-a, and each pair of the multiple pairs may include a respective downlink capability for the UE 115-a and a respective uplink capability for the UE 115-a associated with a respective operating condition for the UE 115-a. For example, a first pair of capabilities may include a quantity of MIMO layers for codebook-based uplink communications while operating in the full-duplex mode and a quantity of MIMO layers for codebook-based downlink communications while operating in the full-duplex mode, while a second pair of capabilities may include a quantity of MIMO layers for non-codebook-based uplink communications while operating in the full-duplex mode and a quantity of MIMO layers for non-codebook-based downlink communications while operating in the full-duplex mode In cases where the UE 115-*a* indicates multiple pairs of downlink and uplink capabilities associated with operating in the full-duplex mode, the indication of full-duplex capability 205 may indicate, from among the multiple pairs, one pair as a default pair of downlink and uplink capabilities associated with operating in the full-duplex mode. For example, the UE 115-*a* may assume that no pairs of capabilities are indicated other than the pair indicated as the default pair in cases where a configuration is missing.

In some examples, the one or more capabilities indicated by the indication of full-duplex capability 205 may include a first pair of downlink and uplink capabilities associated with operating in the full-duplex mode The first pair may include a first downlink capability for the UE 115-*a* and a first uplink capability for the UE 115-*a*. In such examples, the UE 115-*a* may transmit, based on detecting a change in capability for the UE 115-*a* (e.g., a change in the amount of clutter or interference experienced by the UE 115-*a*), updated capability information that indicates a second pair of downlink and uplink capabilities associated with operating in the full-duplex mode. The second pair may include a second downlink capability for the UE 115-*a*, a second uplink capability for the UE 115-*a*, or both.

In some examples, the one or more capabilities of the UE 115-*a* associated with operating in a full-duplex mode may be applicable to an entire serving cell. Additionally, or alternatively, the one or more capabilities of the UE 115-*a* associated with operating in a full-duplex mode may be specific to a respective bandwidth part.

In some examples, the one or more capabilities indicated by the indication of full-duplex capability 205 may indicate a difference between the capability of the UE 115-*a* for full-duplex communications relative to a corresponding capability of the UE 115-*a* for half-duplex communications. For example, the UE 115-*a* may indicate that four MIMO layers are available for codebook-based uplink transmission in a half-duplex mode, and the corresponding indication of full-duplex capability 205 may indicate a full-duplex reduction capability of three, which the network entity 105-*a* may interpret to mean that one MIMO layer is available for codebook-based uplink transmission in a full-duplex mode. The network entity 105-*a* may assume that the full-duplex capability is reduced relative to the half-duplex capability, rather than enhanced.

In cases where the UE 115-*a* indicates multiple pairs of downlink and uplink capabilities associated with operating in the full-duplex mode, the indication of full-duplex capability 205 may indicate a first difference between an uplink capability of the UE 115-*a* for full-duplex communications relative to a corresponding uplink capability of the UE 115-*a* for half-duplex communications and may further indicate a second difference between a downlink capability of the UE 115-*a* for full-duplex communications relative to a corresponding downlink capability of the UE 115-*a* for half-duplex communications. That is, the UE 115-*a* may indicate, to the network entity 105-*a*, pairs of full-duplex capability differences (e.g., reductions) relative to corresponding half-duplex capabilities.

The network entity 105-*a* may infer useful information about the UE 115-*a* from a quantity of antenna panels used by the UE 115-*a* for full-duplex communications. For example, a UE 115 with a single antenna panel available for full-duplex communications may experience more self-interference relative to a UE 115 with multiple antenna panels available for full-duplex communications. Thus, the indication of full-duplex capability 205 may indicate a total quantity of antenna panels of the UE 115-*a* that are available for full-duplex communications. Additionally, or alternatively, the indication of full-duplex capability 205 may indicate a quantity of antenna panels available for transmission in the full-duplex mode, a quantity of antenna panels available for reception in the full-duplex mode, a respective quantity of transmission chains available for each antenna panel included in the quantity of antenna panels, a respective quantity of reception chains available for each antenna panel included in the quantity of antenna panels, or any combination thereof.

In some examples, the indication of full-duplex capability 205 may indicate whether a spatial division multiplexing (SDM) scheme (e.g., a single frequency network (SFN) scheme) associated with a half-duplex mode is supported by the UE 115-*a* for the full-duplex mode. For example, if two antenna panels are available for half-duplex transmission, the UE 115-*a* may have one antenna panel available for full-duplex transmission and one antenna panel available for full-duplex reception or the UE 115-*a* may have two antenna panels available for full-duplex transmission and one antenna panel available for full-duplex reception (e.g., by splitting one antenna panel into two antenna panels, or by using an additional panel that is dropped in the half-duplex mode).

Figure 3:
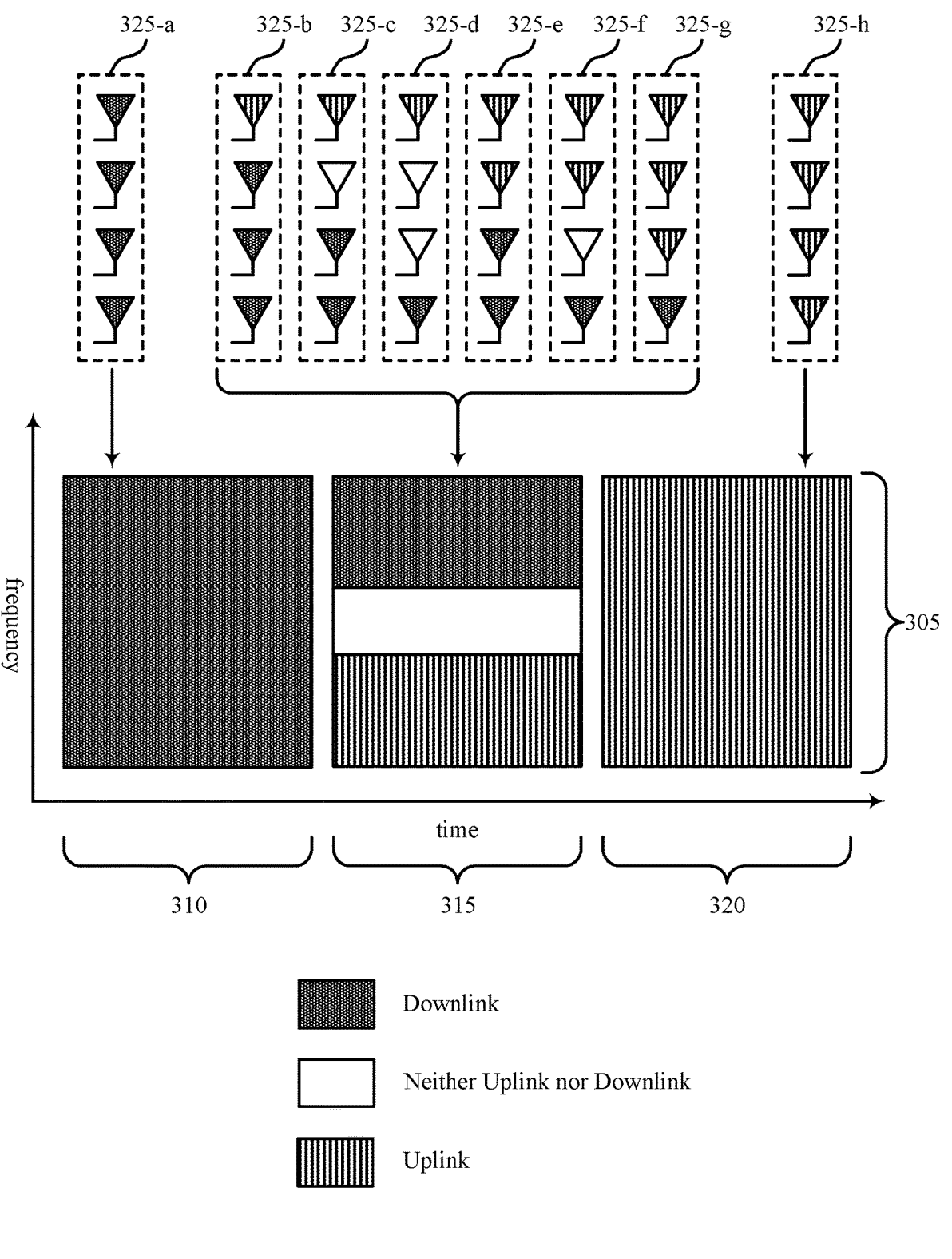
FIG. 3 shows an example of a resource diagram that supports capability reporting for full-duplex wireless communications in accordance with one or more aspects of the present disclosure.

FIG. 3 shows an example of a resource diagram 300 that supports capability reporting for full-duplex wireless communications in accordance with one or more aspects of the present disclosure. The resource diagram 300 may implement or be implemented to realize aspects of the wireless communications system 100 and the wireless communications system 200 described with reference to FIGS. 1 and 2. For example, the resource diagram 300 may be implemented by a UE 115 and a network entity 105, which may be examples of corresponding devices described herein, including with reference to FIGS. 1, 2, and 4 to support full-duplex communications. In some examples, the UE 115 may establish a connection with the network entity 105, transmit a full-duplex capability of the UE 115, and communicate with the network entity 105 in accordance with the transmitted full-duplex capability.

For example, the resource diagram 300 illustrates communications in a TDD frequency band 305, in which the UE 115 and the network entity 105 may perform both uplink and downlink communications within the same TDD frequency band 305. For example, a first slot (e.g., the downlink half-duplex slot 310) in the TDD frequency band 305 may be used for downlink communications (e.g., half-duplex downlink communications) and a second slot (e.g., the uplink half-duplex slot 320) in the TDD frequency band 305 may be used for uplink communications (e.g., half-duplex uplink communications). The resource diagram 300 illustrates both half-duplex and full-duplex communications between the network entity 105 and the UE 115. For example, a third slot (e.g., the full-duplex slot 315) in the TDD frequency band 305 may be a full-duplex slot (e.g., an SBFD slot, or a flexible duplex slot) in which a first subband in the full-duplex slot is used for uplink communications and a second subband in the full-duplex slot is used for downlink communications. In some examples, the UE 115 may receive downlink messages in the downlink subband of the full-duplex slot 315 of the TDD frequency band 305 at a time at least partially overlapping with a time at which the UE 115 may transmit messages in the uplink subband of the full-duplex slot 315 of the TDD frequency band. The uplink subband and the downlink subband may be separated in the frequency domain by a guard band that is used for neither uplink communications nor downlink communications.

The UE 115 may perform capability reporting per band, and may report a half-duplex capability and refrain from reporting a full-duplex capability for operation in a typical TDD frequency band. For example, the UE 115 may report one or more half-duplex capabilities (e.g., a coherency capability, a quantity of MIMO layers, and a quantity of SRS resources per resource set for uplink, downlink, codebook-based, and non-codebook-based communications in a half-duplex mode) to the network entity 105.

In some examples, however, the UE 115-*a* may operate in a half-duplex mode in a first set of one or more slots in the TDD frequency band 305 (e.g., the downlink half-duplex slot 310 and the uplink half-duplex slot 320) and may operate in a full-duplex mode in a second set of one or more slots (e.g., the full-duplex slot 315) in the TDD frequency band 305. The capabilities of the UE 115 may be different for operations in the half-duplex mode and the full-duplex mode. For example, the UE 115 may have four total transmission chains for uplink communications and four total reception chains available for downlink communications in the half-duplex mode, as shown by transmission chain arrangements 325-*h* and 325-*a*, respectively.

For full-duplex communications in the full-duplex slot 315, the UE 115 may support one or more transmission chain arrangements 325. For example, the UE 115 may support transmission chain arrangement 325-*b*, in which one transmission chain is available for uplink communications in the uplink subband of the full-duplex slot 315 of the TDD frequency band 305, and three reception chains are available for downlink communications in the downlink subband of the full-duplex slot 315 of the TDD frequency band 305.

In some examples, the UE 115 may use one or more transmission chains or reception chains as feedback links for interference cancellation. Consequently, the UE 115 may have fewer chains available for uplink and downlink communications. For example, the UE 115 may support transmission chain arrangement 325-*c*, in which one transmission chain is available for uplink communications in the uplink subband of the full-duplex slot 315, two reception chains are available for downlink communications in the downlink subband of the full-duplex slot 315, and one transmission chain is used for neither uplink nor downlink communications. Transmission chain arrangements 325-*d*, 325-*e*, 325-*f*, and 325-*g* illustrate other example arrangements that the UE 115 may support.

The network entity 105 may experience ambiguity regarding which transmission chains arrangement will be used by the UE 115 when transitioning from half-duplex communications (such as downlink communications in the downlink half-duplex slot 310 of the TDD frequency band 305) to full-duplex communications (e.g., full-duplex communications in the full-duplex slot 315 of the TDD frequency band 305). Similar ambiguity may exist for other full-duplex capabilities of the UE 115, such as a coherency capability, a quantity of MIMO layers, and a quantity of SRS resources per resource set for uplink, downlink, codebook-based, and non-codebook-based communications.

To reduce ambiguity and improve coordination between the UE 115 and the network entity 105, the UE 115 may transmit, to the network entity 105 via the TDD frequency band 305, capability information that indicates one or more capabilities of the UE 115 associated with operating in the full-duplex mode (e.g., in the full-duplex slot 315) within the TDD frequency band 305. The UE 115 and the network entity 105 may perform full-duplex communications within the full-duplex slot 315 of the TDD frequency band 305 in accordance with the one or more indicated capabilities. Options for indicating the one or more capabilities are described in more detail with reference to FIGS. 2 and 4.

Figure 4:
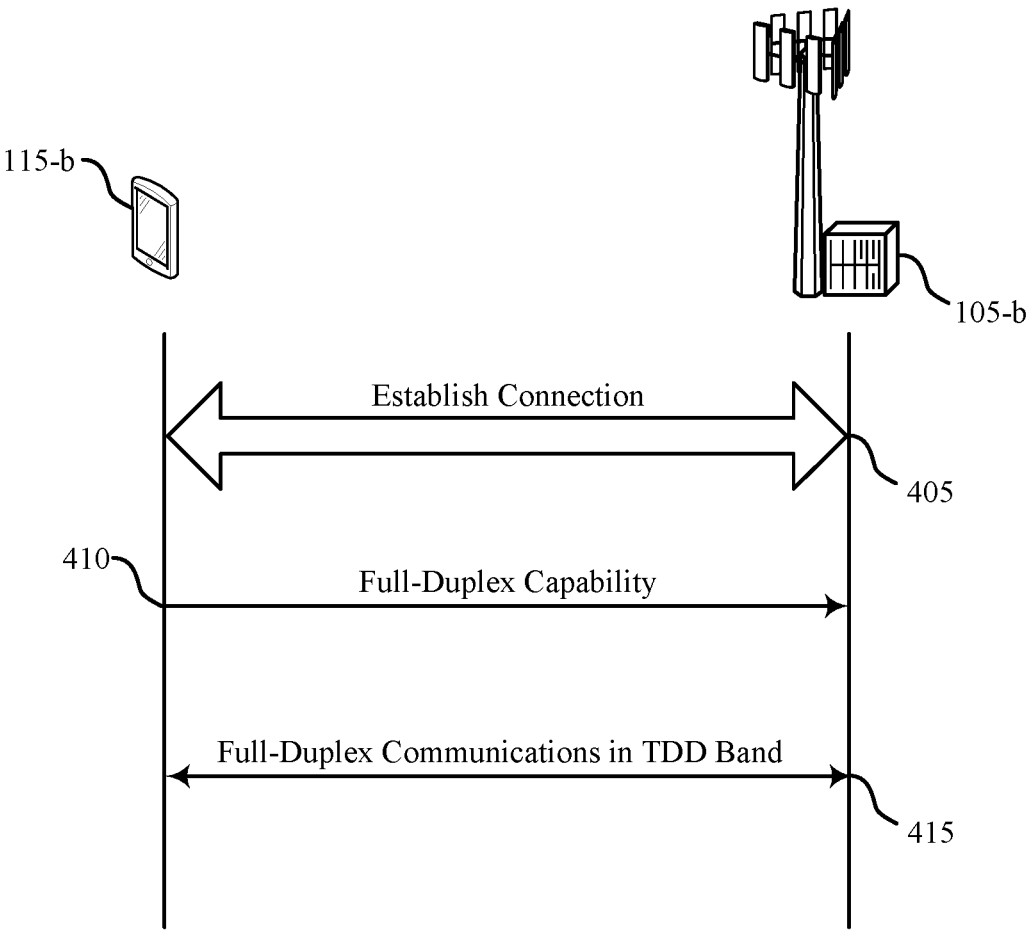
FIG. 4 shows an example of a process flow that supports capability reporting for full-duplex wireless communications in accordance with one or more aspects of the present disclosure.

FIG. 4 shows an example of a process flow 400 that supports capability reporting for full-duplex wireless communications in accordance with one or more aspects of the present disclosure. In some examples, the process flow 400 may be implemented by, or may implement aspects of, wireless communications systems 100 and 200 and resource diagram 300. For example, the process flow 400 includes a network entity 105-*b* and a UE 115-*b*, which may be examples of the corresponding devices described with reference to FIGS. 1 and 2. Following the process flow 400, the UE 115-*b* may perform full-duplex communications with the network entity 105-*b* using capabilities of the UE 115-*b* indicated to the network entity 105-*b*. Alternative examples of the following may be implemented, where some steps are performed in a different order than described or are not performed at all. In some cases, steps may include additional features not mentioned below, or further steps may be added. Although the UE 115-*b* and the network entity 105-*b* are shown performing the operations of the process flow 400, some aspects of some operations may also be performed by one or more other wireless devices.

At 405, the UE 115-*b* may establish a connection with a network entity 105-*b* for operation within a TDD frequency band.

At 410, the UE 115-*b* may transmit, to the network entity 105-*b* via the TDD frequency band, capability information that indicates one or more capabilities of the UE 115-*b* associated with operating in a full-duplex mode within the TDD frequency band. [the capability info could be one of several/many options, discussed below.]

In some examples, the capability information may indicate a coherency capability of the UE 115-*b* for the full-duplex mode. The coherency capability of the UE 115-*b* for the full-duplex mode may include whether the UE 115-*b* supports a fully coherent codebook subset, a partially coherent codebook subset, or a non-coherent codebook subset for the full-duplex mode. The capability information may indicate a relationship between the coherency capability of the UE 115-*b* for the full-duplex mode and a coherency capability of the UE 115-*b* for a half-duplex mode. The capability information may indicate the coherency capability of the UE 115-*b* for the full-duplex mode independently from a coherency capability of the UE 115-*b* for a half-duplex mode.

The capability information may indicate a maximum quantity of MIMO layers supported by the UE 115-*b* for codebook-based uplink communications in the full-duplex mode, a maximum quantity of MIMO layers supported by the UE 115-*b* for non-codebook-based uplink communications in the full-duplex mode, a maximum quantity of MIMO layers supported by the UE 115-*b* for downlink communications in the full-duplex mode, or any combination thereof.

The capability information may indicate a maximum quantity of SRS resources per SRS resource set supported by the UE 115-*b* in the full-duplex mode, a maximum quantity of SRS resources for concurrent SRS transmission by the UE 115-*b* in the full-duplex mode, or any combination thereof.

The capability information may indicate multiple pairs of downlink and uplink capabilities associated with operating in the full-duplex mode. The multiple pairs may correspond to different operating conditions for the UE 115-*b*, and each pair of the multiple pairs may include a respective downlink capability for the UE 115-b and a respective uplink capability for the UE 115-b associated with a respective operating condition for the UE 115-b. In such examples, the capability information may indicate, from among the multiple pairs, one pair as a default pair of downlink and uplink capabilities associated with operating in the full-duplex mode. In some examples, the capability information may include a first pair of downlink and uplink capabilities associated with operating in the full-duplex mode, the first pair including a first downlink capability for the UE 115-b and a first uplink capability for the UE 115-b. In such examples, the UE 115-b may transmit, based on detecting a change in capability for the UE 115-b, updated capability information that indicates a second pair of downlink and uplink capabilities associated with operating in the full-duplex mode. The second pair may include a second downlink capability for the UE 115-b, a second uplink capability for the UE 115-b, or both.

In some examples, the one or more capabilities of the UE 115-b associated with operating in a full-duplex mode may be applicable to an entire serving cell. Additionally, or alternatively, the one or more capabilities of the UE 115-b associated with operating in a full-duplex mode may be specific to a respective bandwidth part.

The capability information may indicate a difference between the capability of the UE 115-b for full-duplex communications relative to a corresponding capability of the UE 115-b for half-duplex communications. For example, the capability information may indicate a first difference between an uplink capability of the UE 115-b for full-duplex communications relative to a corresponding uplink capability of the UE 115-b for half-duplex communications and may further indicate a second difference between a downlink capability of the UE 115-b for full-duplex communications relative to a corresponding downlink capability of the UE 115-b for half-duplex communications.

The capability information may indicate a quantity of antenna panels of the UE 115-b that are available for full-duplex communications. The capability information may indicate a quantity of antenna panels available for transmission in the full-duplex mode, a quantity of antenna panels available for reception in the full-duplex mode, a respective quantity of transmission chains available for each antenna panel included in the quantity of antenna panels, a respective quantity of reception chains available for each antenna panel included in the quantity of antenna panels, or any combination thereof.

The capability information may indicate whether an SDM scheme associated with a half-duplex mode is supported by the UE 115-b for the full-duplex mode.

The UE 115-b may transmit, to the network entity 105-b via the TDD frequency band, additional capability information that indicates one or more capabilities of the UE 115-b associated with operating in a half-duplex mode within the TDD frequency band. That is, a first group of capability indications may include the capability information associated with operating in the full-duplex mode and a second group of capability indications may include the additional capability information associated with operating in the half-duplex mode. Additionally, or alternatively, the UE 115-b may transmit, to the network entity 105-b via the TDD frequency band, additional capability information that indicates one or more capabilities of the UE 115-b associated with operating in a half-duplex mode within the TDD frequency band, where a same group of capability indications includes the capability information associated with operating in the full-duplex mode and the additional capability information associated with operating in the half-duplex mode. The group of capability indications may indicate a single value for a capability included in the one or more capabilities of the UE 115-b when the capability is identical for the full-duplex mode and the half-duplex mode. Additionally, or alternatively, the group of capability indications may indicate two values for a capability included in the one or more capabilities of the UE 115-b when the capability is different for the full-duplex mode than the half-duplex mode.

At 415, the UE 115-b may perform, with the network entity 105-b, full-duplex communications within the TDD frequency band in accordance with the one or more indicated capabilities. In some examples, performing the full-duplex communications within the TDD frequency band may include transmitting first signaling within a first subband of the TDD frequency band concurrent with receiving second signaling within a second subband of the TDD frequency band.

Figure 5:
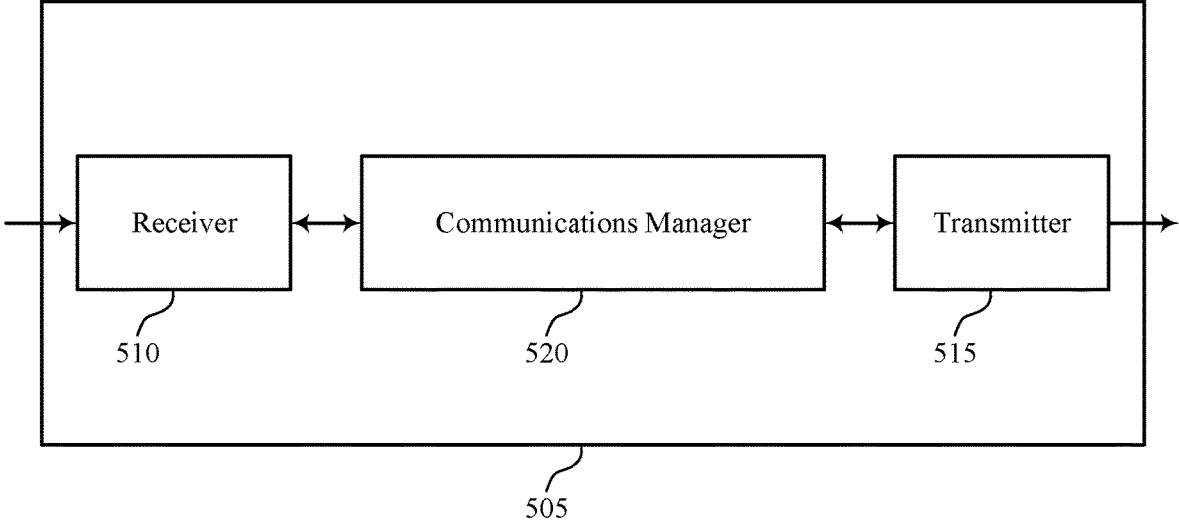
FIGS. 5 and 6 show block diagrams of devices that support capability reporting for full-duplex wireless communications in accordance with one or more aspects of the present disclosure.

FIG. 5 shows a block diagram 500 of a device 505 that supports capability reporting for full-duplex wireless communications in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to capability reporting for full-duplex wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to capability reporting for full-duplex wireless communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of capability reporting for full-duplex wireless communications as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for establishing a connection with a network entity for operation within a TDD frequency band. The communications manager 520 is capable of, configured to, or operable to support a means for transmitting, to the network entity via the TDD frequency band, capability information that indicates one or more capabilities of the UE associated with operating in a full-duplex mode within the TDD frequency band. The communications manager 520 is capable of, configured to, or operable to support a means for performing, with the network entity, full-duplex communications within the TDD frequency band in accordance with the one or more indicated capabilities, where performing the full-duplex communications within the TDD frequency band includes transmitting first signaling within a first subband of the TDD frequency band concurrent with receiving second signaling within a second subband of the TDD frequency band.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for more efficient utilization of communication resources.

Figure 6:
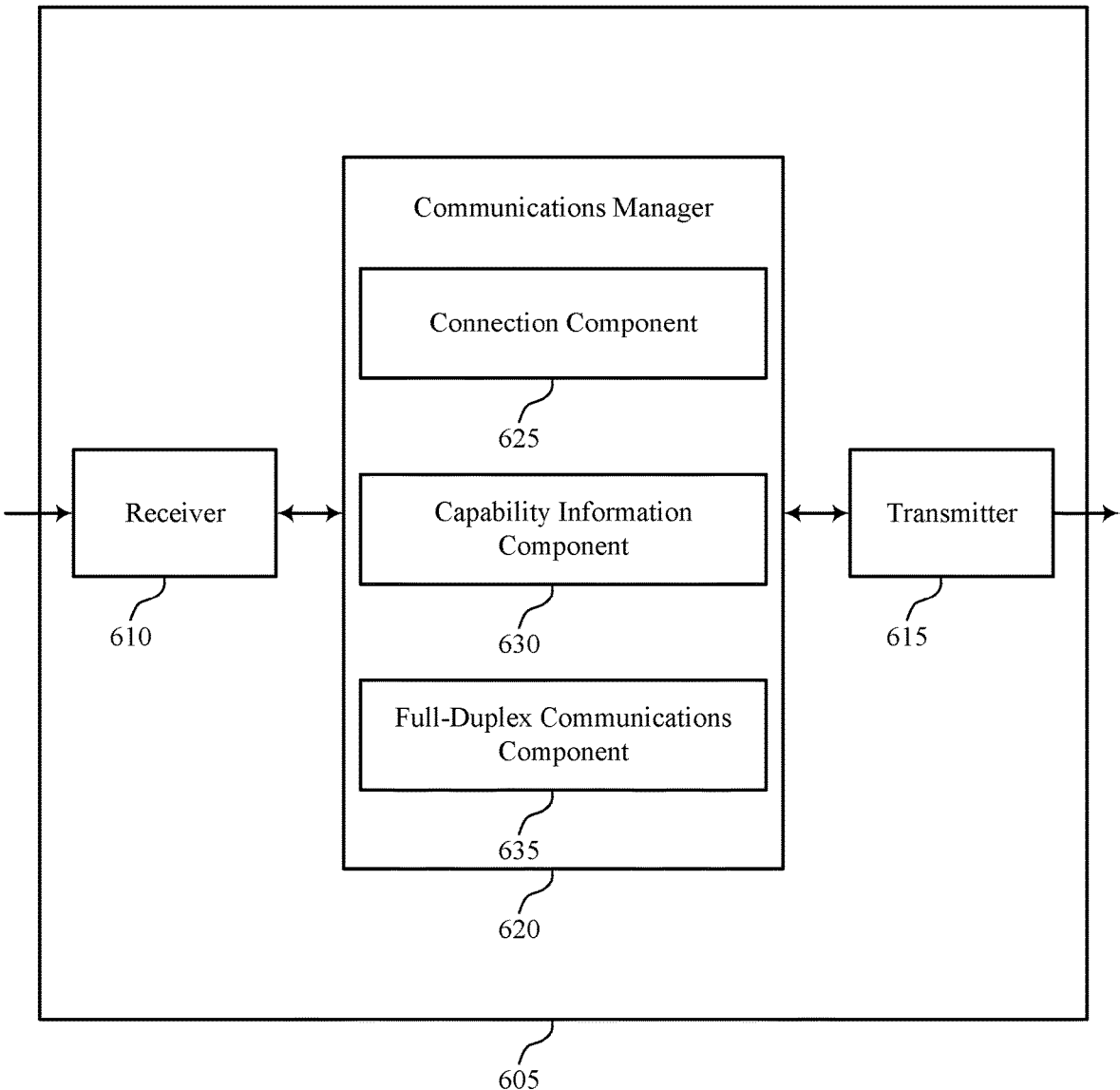

FIG. 6 shows a block diagram 600 of a device 605 that supports capability reporting for full-duplex wireless communications in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to capability reporting for full-duplex wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to capability reporting for full-duplex wireless communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of capability reporting for full-duplex wireless communications as described herein. For example, the communications manager 620 may include a connection component 625, a capability information component 630, a full-duplex communications component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The connection component 625 is capable of, configured to, or operable to support a means for establishing a connection with a network entity for operation within a TDD frequency band. The capability information component 630 is capable of, configured to, or operable to support a means for transmitting, to the network entity via the TDD frequency band, capability information that indicates one or more capabilities of the UE associated with operating in a full-duplex mode within the TDD frequency band. The full-duplex communications component 635 is capable of, configured to, or operable to support a means for performing, with the network entity, full-duplex communications within the TDD frequency band in accordance with the one or more indicated capabilities, where performing the full-duplex communications within the TDD frequency band includes transmitting first signaling within a first subband of the TDD frequency band concurrent with receiving second signaling within a second subband of the TDD frequency band.

Figure 7:
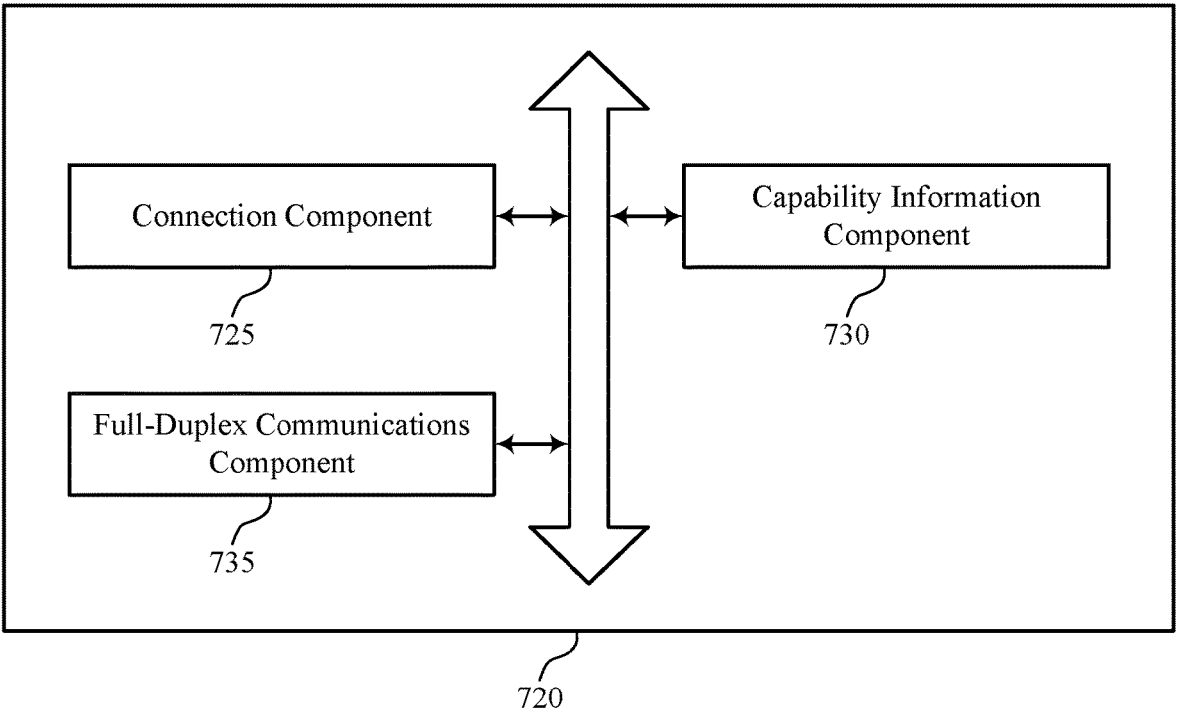
FIG. 7 shows a block diagram of a communications manager that supports capability reporting for full-duplex wireless communications in accordance with one or more aspects of the present disclosure.

FIG. 7 shows a block diagram 700 of a communications manager 720 that supports capability reporting for full-duplex wireless communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of capability reporting for full-duplex wireless communications as described herein. For example, the communications manager 720 may include a connection component 725, a capability information component 730, a full-duplex communications component 735, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The connection component 725 is capable of, configured to, or operable to support a means for establishing a connection with a network entity for operation within a TDD frequency band. The capability information component 730 is capable of, configured to, or operable to support a means for transmitting, to the network entity via the TDD frequency band, capability information that indicates one or more capabilities of the UE associated with operating in a full-duplex mode within the TDD frequency band. The full-duplex communications component 735 is capable of, configured to, or operable to support a means for performing, with the network entity, full-duplex communications within the TDD frequency band in accordance with the one or more indicated capabilities, where performing the full-duplex communications within the TDD frequency band includes transmitting first signaling within a first subband of the TDD frequency band concurrent with receiving second signaling within a second subband of the TDD frequency band.

In some examples, to indicate the one or more capabilities of the UE for full-duplex communications, the capability information indicates a coherency capability of the UE for the full-duplex mode, the coherency capability of the UE for the full-duplex mode including whether the UE supports a fully coherent codebook subset, a partially coherent codebook subset, or a non-coherent codebook subset for the full-duplex mode.

In some examples, to indicate the coherency capability of the UE for the full-duplex mode, the capability information indicates a relationship between the coherency capability of the UE for the full-duplex mode and a coherency capability of the UE for a half-duplex mode.

In some examples, the capability information indicates the coherency capability of the UE for the full-duplex mode independently from a coherency capability of the UE for a half-duplex mode.

In some examples, to indicate the one or more capabilities of the UE for full-duplex communications, the capability information indicates a maximum quantity of MIMO layers supported by the UE for codebook-based uplink communications in the full-duplex mode, a maximum quantity of MIMO layers supported by the UE for non-codebook-based uplink communications in the full-duplex mode, a maximum quantity of MIMO layers supported by the UE for downlink communications in the full-duplex mode, or any combination thereof.

In some examples, to indicate the one or more capabilities of the UE for full-duplex communications, the capability information indicates a maximum quantity of SRS resources per SRS resource set supported by the UE in the full-duplex mode, a maximum quantity of SRS resources for concurrent SRS transmission by the UE in the full-duplex mode, or any combination thereof.

In some examples, the capability information component 730 is capable of, configured to, or operable to support a means for transmitting, to the network entity via the TDD frequency band, additional capability information that indicates one or more capabilities of the UE associated with operating in a half-duplex mode within the TDD frequency band, where a first group of capability indications includes the capability information associated with operating in the full-duplex mode and a second group of capability indications includes the additional capability information associated with operating in the half-duplex mode.

In some examples, the capability information component 730 is capable of, configured to, or operable to support a means for transmitting, to the network entity via the TDD frequency band, additional capability information that indicates one or more capabilities of the UE associated with operating in a half-duplex mode within the TDD frequency band, where a same group of capability indications includes the capability information associated with operating in the full-duplex mode and the additional capability information associated with operating in the half-duplex mode.

In some examples, the group of capability indications is operable to indicate a single value for a capability included in the one or more capabilities of the UE when the capability is identical for the full-duplex mode and the half-duplex mode.

In some examples, the group of capability indications is operable to indicate two values for a capability included in the one or more capabilities of the UE when the capability is different for the full-duplex mode than the half-duplex mode.

In some examples, the capability information indicates multiple pairs of downlink and uplink capabilities associated with operating in the full-duplex mode, the multiple pairs corresponding to different operating conditions for the UE, each pair of the multiple pairs including a respective downlink capability for the UE and a respective uplink capability for the UE associated with a respective operating condition for the UE.

In some examples, the capability information indicates, from among the multiple pairs, one pair as a default pair of downlink and uplink capabilities associated with operating in the full-duplex mode.

In some examples, the capability information indicates a first pair of downlink and uplink capabilities associated with operating in the full-duplex mode, the first pair including a first downlink capability for the UE and a first uplink capability for the UE, and the capability information component 730 is capable of, configured to, or operable to support a means for transmitting, based on detecting a change in capability for the UE, updated capability information that indicates a second pair of downlink and uplink capabilities associated with operating in the full-duplex mode, the second pair including a second downlink capability for the UE, a second uplink capability for the UE, or both.

In some examples, the one or more capabilities of the UE associated with operating in a full-duplex mode are applicable to an entire serving cell.

In some examples, the one or more capabilities of the UE associated with operating in a full-duplex mode are specific to a respective bandwidth part.

In some examples, to indicate a capability included in the one or more capabilities of the UE for full-duplex communications, the capability information indicates a difference between the capability of the UE for full-duplex communications relative to a corresponding capability of the UE for half-duplex communications.

In some examples, to indicate a capability included in the one or more capabilities of the UE for full-duplex communications, the capability information indicates a first difference between an uplink capability of the UE for full-duplex communications relative to a corresponding uplink capability of the UE for half-duplex communications and further indicates a second difference between a downlink capability of the UE for full-duplex communications relative to a corresponding downlink capability of the UE for half-duplex communications.

In some examples, to indicate the one or more capabilities of the UE for full-duplex communications, the capability information indicates a quantity of antenna panels of the UE that are available for full-duplex communications.

In some examples, to indicate the one or more capabilities of the UE for full-duplex communications, the capability information indicates whether a spatial division multiplexing scheme associated with a half-duplex mode is supported by the UE for the full-duplex mode.

Figure 8:
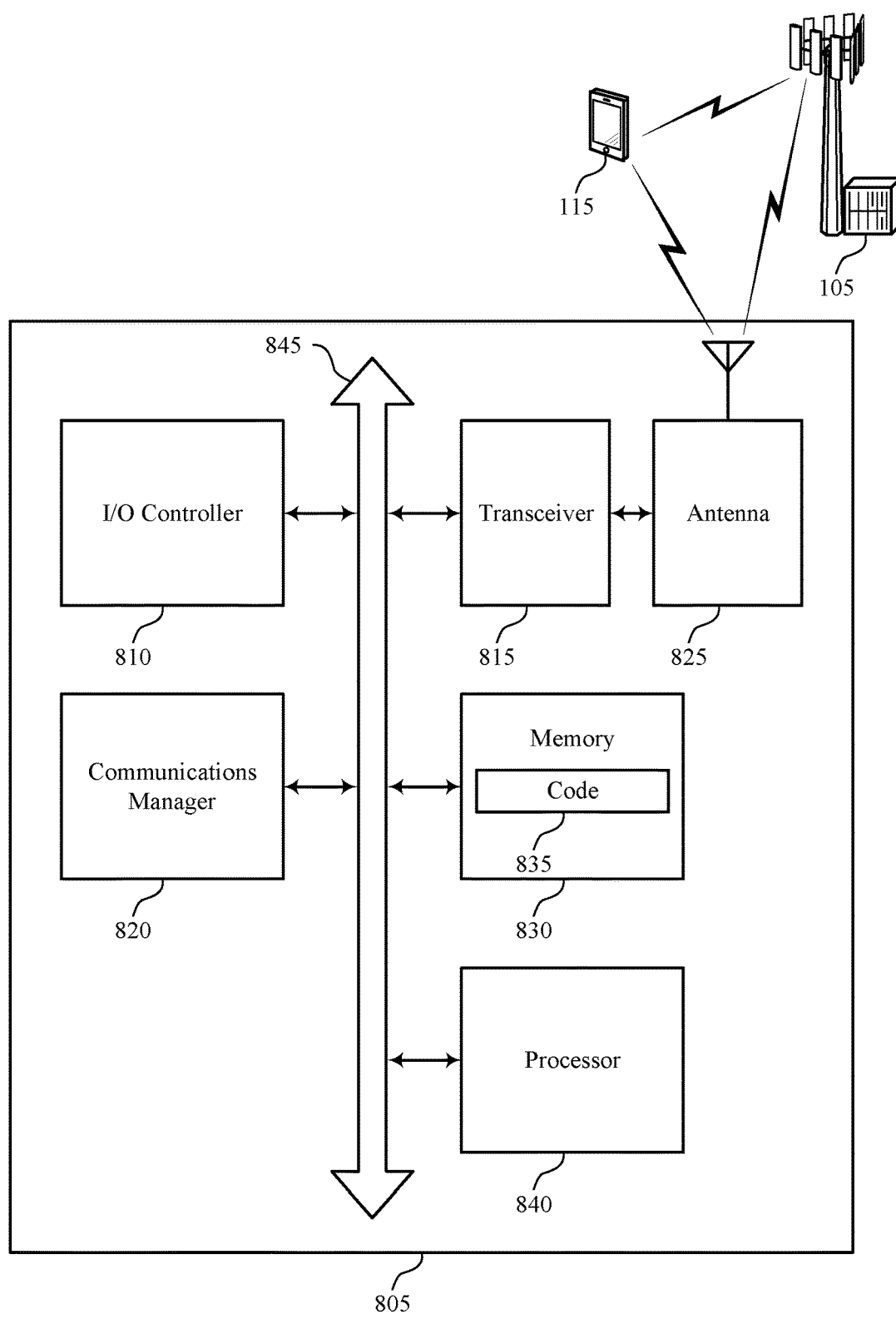
FIG. 8 shows a diagram of a system including a device that supports capability reporting for full-duplex wireless communications in accordance with one or more aspects of the present disclosure.

FIG. 8 shows a diagram of a system 800 including a device 805 that supports capability reporting for full-duplex wireless communications in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROIDR, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting capability reporting for full-duplex wireless communications). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. As such, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for establishing a connection with a network entity for operation within a TDD frequency band. The communications manager 820 is capable of, configured to, or operable to support a means for transmitting, to the network entity via the TDD frequency band, capability information that indicates one or more capabilities of the UE associated with operating in a full-duplex mode within the TDD frequency band. The communications manager 820 is capable of, configured to, or operable to support a means for performing, with the network entity, full-duplex communications within the TDD frequency band in accordance with the one or more indicated capabilities, where performing the full-duplex communications within the TDD frequency band includes transmitting first signaling within a first subband of the TDD frequency band concurrent with receiving second signaling within a second subband of the TDD frequency band.

By including or configuring the communications manager 820 in accordance with examples as described herein, the device 805 may support techniques for improved communication reliability, reduced latency, improved user experience related to reduced processing, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of capability reporting for full-duplex wireless communications as described herein, or the at least one processor 840 and the at least one memory 830 may be otherwise configured to, individually or collectively, perform or support such operations.

Figure 9:
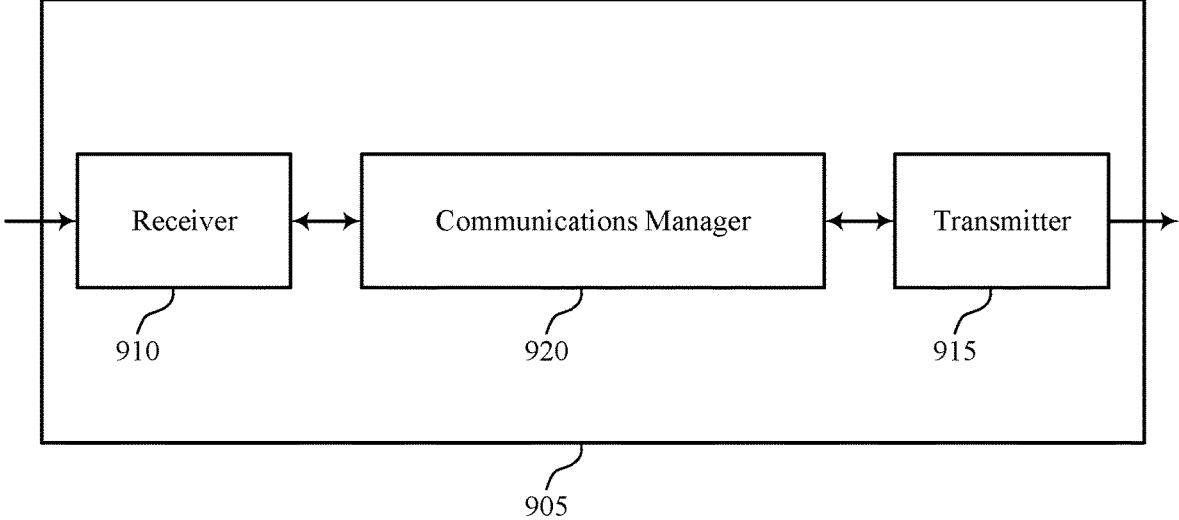
FIGS. 9 and 10 show block diagrams of devices that support capability reporting for full-duplex wireless communications in accordance with one or more aspects of the present disclosure.

FIG. 9 shows a block diagram 900 of a device 905 that supports capability reporting for full-duplex wireless communications in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of capability reporting for full-duplex wireless communications as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for establishing a connection with a UE for operation within a TDD frequency band. The communications manager 920 is capable of, configured to, or operable to support a means for receiving, from the UE via the TDD frequency band, capability information that indicates one or more capabilities of the UE associated with operating in a full-duplex mode within the TDD frequency band. The communications manager 920 is capable of, configured to, or operable to support a means for performing, with the UE, full-duplex communications within the TDD frequency band in accordance with the one or more indicated capabilities, where performing the full-duplex communications within the TDD frequency band includes receiving first signaling within a first subband of the TDD frequency band concurrent with transmitting second signaling within a second subband of the TDD frequency band.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for more efficient utilization of communication resources.

Figure 10:
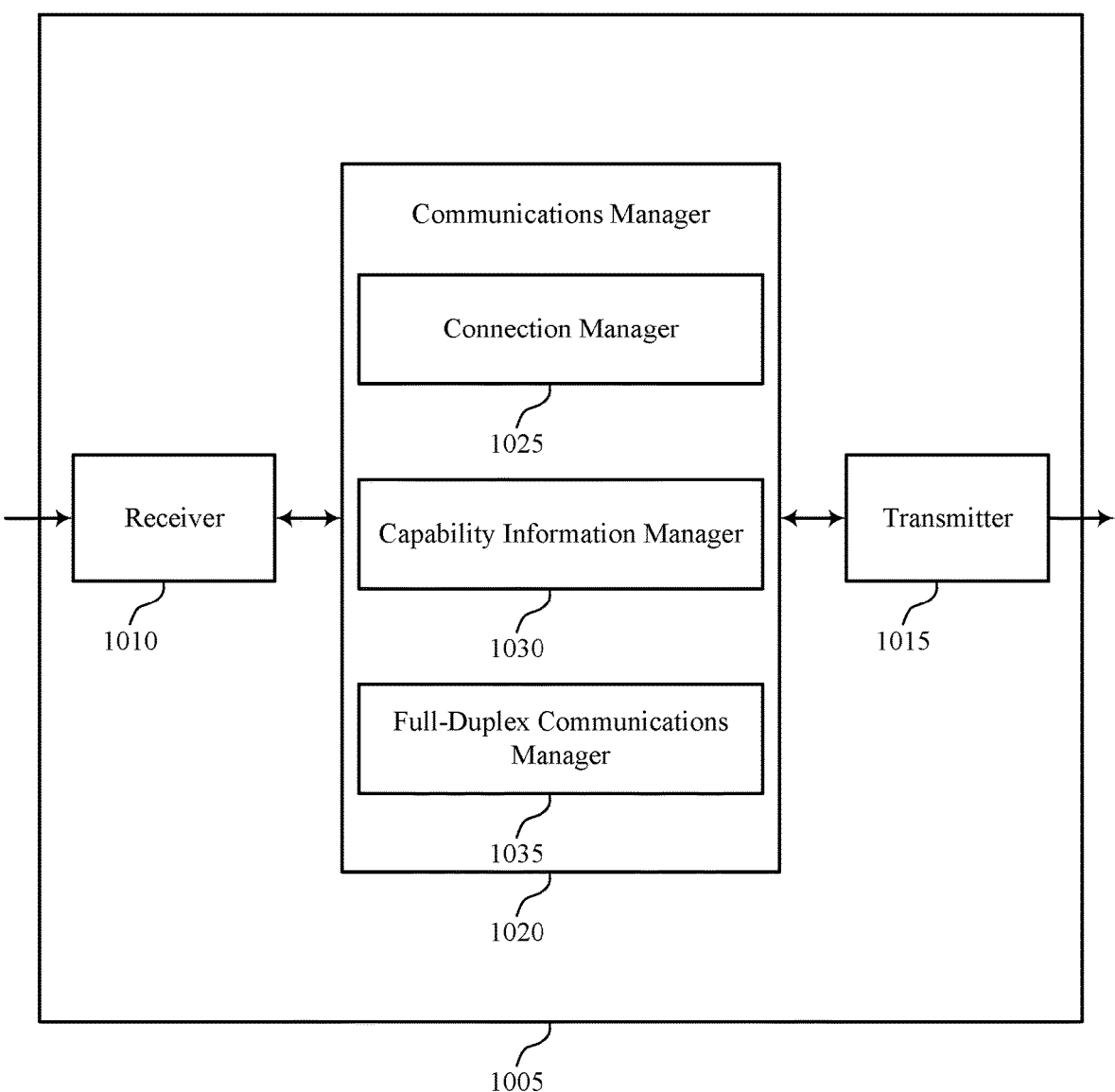

FIG. 10 shows a block diagram 1000 of a device 1005 that supports capability reporting for full-duplex wireless communications in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of capability reporting for full-duplex wireless communications as described herein. For example, the communications manager 1020 may include a connection manager 1025, a capability information manager 1030, a full-duplex communications manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The connection manager 1025 is capable of, configured to, or operable to support a means for establishing a connection with a UE for operation within a TDD frequency band. The capability information manager 1030 is capable of, configured to, or operable to support a means for receiving, from the UE via the TDD frequency band, capability information that indicates one or more capabilities of the UE associated with operating in a full-duplex mode within the TDD frequency band. The full-duplex communications manager 1035 is capable of, configured to, or operable to support a means for performing, with the UE, full-duplex communications within the TDD frequency band in accordance with the one or more indicated capabilities, where performing the full-duplex communications within the TDD frequency band includes receiving first signaling within a first subband of the TDD frequency band concurrent with transmitting second signaling within a second subband of the TDD frequency band.

Figure 11:
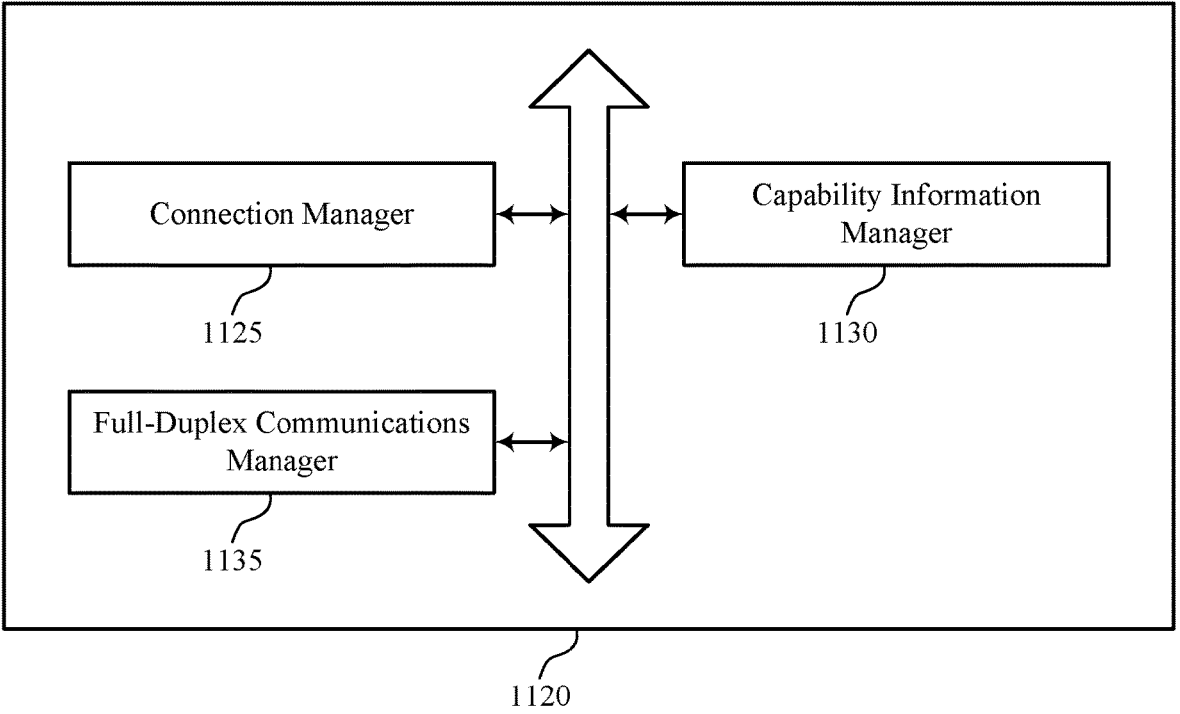
FIG. 11 shows a block diagram of a communications manager that supports capability reporting for full-duplex wireless communications in accordance with one or more aspects of the present disclosure.

FIG. 11 shows a block diagram 1100 of a communications manager 1120 that supports capability reporting for full-duplex wireless communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of capability reporting for full-duplex wireless communications as described herein. For example, the communications manager 1120 may include a connection manager 1125, a capability information manager 1130, a full-duplex communications manager 1135, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The connection manager 1125 is capable of, configured to, or operable to support a means for establishing a connection with a UE for operation within a TDD frequency band. The capability information manager 1130 is capable of, configured to, or operable to support a means for receiving, from the UE via the TDD frequency band, capability information that indicates one or more capabilities of the UE associated with operating in a full-duplex mode within the TDD frequency band. The full-duplex communications manager 1135 is capable of, configured to, or operable to support a means for performing, with the UE, full-duplex communications within the TDD frequency band in accordance with the one or more indicated capabilities, where performing the full-duplex communications within the TDD frequency band includes receiving first signaling within a first subband of the TDD frequency band concurrent with transmitting second signaling within a second subband of the TDD frequency band.

In some examples, to indicate the one or more capabilities of the UE for full-duplex communications, the capability information indicates a coherency capability of the UE for the full-duplex mode, the coherency capability of the UE for the full-duplex mode including whether the UE supports a fully coherent codebook subset, a partially coherent codebook subset, or a non-coherent codebook subset for the full-duplex mode.

In some examples, to indicate the coherency capability of the UE for the full-duplex mode, the capability information indicates a relationship between the coherency capability of the UE for the full-duplex mode and a coherency capability of the UE for a half-duplex mode.

In some examples, the capability information indicates the coherency capability of the UE for the full-duplex mode independently from a coherency capability of the UE for a half-duplex mode.

In some examples, to indicate the one or more capabilities of the UE for full-duplex communications, the capability information indicates a maximum quantity of MIMO layers supported by the UE for codebook-based uplink communications in the full-duplex mode, a maximum quantity of MIMO layers supported by the UE for non-codebook-based uplink communications in the full-duplex mode, a maximum quantity of MIMO layers supported by the UE for downlink communications in the full-duplex mode, or any combination thereof.

In some examples, to indicate the one or more capabilities of the UE for full-duplex communications, the capability information indicates a maximum quantity of SRS resources per SRS resource set supported by the UE in the full-duplex mode, a maximum quantity of SRS resources for concurrent SRS transmission by the UE in the full-duplex mode, or any combination thereof.

In some examples, the capability information manager 1130 is capable of, configured to, or operable to support a means for receiving, from the UE via the TDD frequency band, additional capability information that indicates one or more capabilities of the UE associated with operating in a half-duplex mode within the TDD frequency band, where a first group of capability indications includes the capability information associated with operating in the full-duplex mode and a second group of capability indications includes the additional capability information associated with operating in the half-duplex mode.

In some examples, the capability information manager 1130 is capable of, configured to, or operable to support a means for receiving, from the UE via the TDD frequency band, additional capability information that indicates one or more capabilities of the UE associated with operating in a half-duplex mode within the TDD frequency band, where a same group of capability indications includes the capability information associated with operating in the full-duplex mode and the additional capability information associated with operating in the half-duplex mode.

In some examples, the group of capability indications is operable to indicate a single value for a capability included in the one or more capabilities of the UE when the capability is identical for the full-duplex mode and the half-duplex mode.

In some examples, the group of capability indications is operable to indicate two values for a capability included in the one or more capabilities of the UE when the capability is different for the full-duplex mode than the half-duplex mode.

In some examples, the capability information indicates multiple pairs of downlink and uplink capabilities associated with operating in the full-duplex mode, the multiple pairs corresponding to different operating conditions for the UE, each pair of the multiple pairs including a respective downlink capability for the UE and a respective uplink capability for the UE associated with a respective operating condition for the UE.

In some examples, the capability information indicates, from among the multiple pairs, one pair as a default pair of downlink and uplink capabilities associated with operating in the full-duplex mode.

In some examples, the capability information indicates a first pair of downlink and uplink capabilities associated with operating in the full-duplex mode, the first pair including a first downlink capability for the UE and a first uplink capability for the UE, and the capability information manager 1130 is capable of, configured to, or operable to support a means for receiving, based on a change in capability for the UE, updated capability information that indicates a second pair of downlink and uplink capabilities associated with operating in the full-duplex mode, the second pair including a second downlink capability for the UE, a second uplink capability for the UE, or both.

In some examples, the one or more capabilities of the UE associated with operating in a full-duplex mode are applicable to an entire serving cell.

In some examples, the one or more capabilities of the UE associated with operating in a full-duplex mode are specific to a respective bandwidth part.

In some examples, to indicate a capability included in the one or more capabilities of the UE for full-duplex communications, the capability information indicates a difference between the capability of the UE for full-duplex communications relative to a corresponding capability of the UE for half-duplex communications.

In some examples, to indicate a capability included in the one or more capabilities of the UE for full-duplex communications, the capability information indicates a first difference between an uplink capability of the UE for full-duplex communications relative to a corresponding uplink capability of the UE for half-duplex communications and further indicates a second difference between a downlink capability of the UE for full-duplex communications relative to a corresponding downlink capability of the UE for half-duplex communications.

In some examples, to indicate the one or more capabilities of the UE for full-duplex communications, the capability information indicates a quantity of antenna panels of the UE that are available for full-duplex communications.

In some examples, to indicate the one or more capabilities of the UE for full-duplex communications, the capability information indicates a quantity of antenna panels available for transmission in the full-duplex mode, a quantity of antenna panels available for reception in the full-duplex mode, a respective quantity of transmission chains available for each antenna panel included in the quantity of antenna panels, a respective quantity of reception chains available for each antenna panel included in the quantity of antenna panels, or any combination thereof.

In some examples, to indicate the one or more capabilities of the UE for full-duplex communications, the capability information indicates whether a spatial division multiplexing scheme associated with a half-duplex mode is supported by the UE for the full-duplex mode.

Figure 12:
FIG. 12 shows a diagram of a system including a device that supports capability reporting for full-duplex wireless communications in accordance with one or more aspects of the present disclosure.

FIG. 12 shows a diagram of a system 1200 including a device 1205 that supports capability reporting for full-duplex wireless communications in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting capability reporting for full-duplex wireless communications). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. As such, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for establishing a connection with a UE for operation within a TDD frequency band. The communications manager 1220 is capable of, configured to, or operable to support a means for receiving, from the UE via the TDD frequency band, capability information that indicates one or more capabilities of the UE associated with operating in a full-duplex mode within the TDD frequency band. The communications manager 1220 is capable of, configured to, or operable to support a means for performing, with the UE, full-duplex communications within the TDD frequency band in accordance with the one or more indicated capabilities, where performing the full-duplex communications within the TDD frequency band includes receiving first signaling within a first subband of the TDD frequency band concurrent with transmitting second signaling within a second subband of the TDD frequency band.

By including or configuring the communications manager 1220 in accordance with examples as described herein, the device 1205 may support techniques for improved communication reliability, reduced latency, improved user experience related to reduced processing, more efficient utilization of communication resources, and improved coordination between devices.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of capability reporting for full-duplex wireless communications as described herein, or the at least one processor 1235 and the at least one memory 1225 may be otherwise configured to, individually or collectively, perform or support such operations.

FIG. 13 shows a flowchart illustrating a method 1300 that supports capability reporting for full-duplex wireless communications in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include establishing a connection with a network entity for operation within a TDD frequency band. The operations of block 1305 may be performed in accordance with examples as disclosed herein. In some examples, aspects of the operations of 1305 may be performed by a connection component 725 as described with reference to FIG. 7.

At 1310, the method may include transmitting, to the network entity via the TDD frequency band, capability information that indicates one or more capabilities of the UE associated with operating in a full-duplex mode within the TDD frequency band. The operations of block 1310 may be performed in accordance with examples as disclosed herein. In some examples, aspects of the operations of 1310 may be performed by a capability information component 730 as described with reference to FIG. 7.

At 1315, the method may include performing, with the network entity, full-duplex communications within the TDD frequency band in accordance with the one or more indicated capabilities, where performing the full-duplex communications within the TDD frequency band includes transmitting first signaling within a first subband of the TDD frequency band concurrent with receiving second signaling within a second subband of the TDD frequency band. The operations of block 1315 may be performed in accordance with examples as disclosed herein. In some examples, aspects of the operations of 1315 may be performed by a full-duplex communications component 735 as described with reference to FIG. 7.

FIG. 14 shows a flowchart illustrating a method 1400 that supports capability reporting for full-duplex wireless communications in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include establishing a connection with a network entity for operation within a TDD frequency band. The operations of block 1405 may be performed in accordance with examples as disclosed herein. In some examples, aspects of the operations of 1405 may be performed by a connection component 725 as described with reference to FIG. 7.

At 1410, the method may include transmitting, to the network entity via the TDD frequency band, capability information that indicates one or more capabilities of the UE associated with operating in a full-duplex mode within the TDD frequency band. The operations of block 1410 may be performed in accordance with examples as disclosed herein. In some examples, aspects of the operations of 1410 may be performed by a capability information component 730 as described with reference to FIG. 7.

At 1415, the method may include transmitting, to the network entity via the TDD frequency band, additional capability information that indicates one or more capabilities of the UE associated with operating in a half-duplex mode within the TDD frequency band, where a first group of capability indications includes the capability information associated with operating in the full-duplex mode and a second group of capability indications includes the additional capability information associated with operating in the half-duplex mode. The operations of block 1415 may be performed in accordance with examples as disclosed herein. In some examples, aspects of the operations of 1415 may be performed by a capability information component 730 as described with reference to FIG. 7.

At 1420, the method may include performing, with the network entity, full-duplex communications within the TDD frequency band in accordance with the one or more indicated capabilities, where performing the full-duplex communications within the TDD frequency band includes transmitting first signaling within a first subband of the TDD frequency band concurrent with receiving second signaling within a second subband of the TDD frequency band. The operations of block 1420 may be performed in accordance with examples as disclosed herein. In some examples, aspects of the operations of 1420 may be performed by a full-duplex communications component 735 as described with reference to FIG. 7.

FIG. 15 shows a flowchart illustrating a method 1500 that supports capability reporting for full-duplex wireless communications in accordance with aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include establishing a connection with a UE for operation within a TDD frequency band. The operations of block 1505 may be performed in accordance with examples as disclosed herein. In some examples, aspects of the operations of 1505 may be performed by a connection manager 1125 as described with reference to FIG. 11.

At 1510, the method may include receiving, from the UE via the TDD frequency band, capability information that indicates one or more capabilities of the UE associated with operating in a full-duplex mode within the TDD frequency band. The operations of block 1510 may be performed in accordance with examples as disclosed herein. In some examples, aspects of the operations of 1510 may be performed by a capability information manager 1130 as described with reference to FIG. 11.

At 1515, the method may include performing, with the UE, full-duplex communications within the TDD frequency band in accordance with the one or more indicated capabilities, where performing the full-duplex communications within the TDD frequency band includes receiving first signaling within a first subband of the TDD frequency band concurrent with transmitting second signaling within a second subband of the TDD frequency band. The operations of block 1515 may be performed in accordance with examples as disclosed herein. In some examples, aspects of the operations of 1515 may be performed by a full-duplex communications manager 1135 as described with reference to FIG. 11.

FIG. 16 shows a flowchart illustrating a method 1600 that supports capability reporting for full-duplex wireless communications in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include establishing a connection with a UE for operation within a TDD frequency band. The operations of block 1605 may be performed in accordance with examples as disclosed herein. In some examples, aspects of the operations of 1605 may be performed by a connection manager 1125 as described with reference to FIG. 11.

At 1610, the method may include receiving, from the UE via the TDD frequency band, capability information that indicates one or more capabilities of the UE associated with operating in a full-duplex mode within the TDD frequency band. The operations of block 1610 may be performed in accordance with examples as disclosed herein. In some examples, aspects of the operations of 1610 may be performed by a capability information manager 1130 as described with reference to FIG. 11.

At 1615, the method may include receiving, from the UE via the TDD frequency band, additional capability information that indicates one or more capabilities of the UE associated with operating in a half-duplex mode within the TDD frequency band, where a first group of capability indications includes the capability information associated with operating in the full-duplex mode and a second group of capability indications includes the additional capability information associated with operating in the half-duplex mode. The operations of block 1615 may be performed in accordance with examples as disclosed herein. In some examples, aspects of the operations of 1615 may be performed by a capability information manager 1130 as described with reference to FIG. 11.

At 1620, the method may include performing, with the UE, full-duplex communications within the TDD frequency band in accordance with the one or more indicated capabilities, where performing the full-duplex communications within the TDD frequency band includes receiving first signaling within a first subband of the TDD frequency band concurrent with transmitting second signaling within a second subband of the TDD frequency band. The operations of block 1620 may be performed in accordance with examples as disclosed herein. In some examples, aspects of the operations of 1620 may be performed by a full-duplex communications manager 1135 as described with reference to FIG. 11.

Aspect 1: A method for wireless communications at a UE, comprising: establishing a connection with a network entity for operation within a TDD frequency band, transmitting, to the network entity via the TDD frequency band, capability information that indicates one or more capabilities of the UE associated with operating in a full-duplex mode within the TDD frequency band, and performing, with the network entity, full-duplex communications within the TDD frequency band in accordance with the one or more indicated capabilities, wherein performing the full-duplex communications within the TDD frequency band comprises transmitting first signaling within a first subband of the TDD frequency band concurrent with receiving second signaling within a second subband of the TDD frequency band.

Aspect 2: The method of aspect 1, wherein, to indicate the one or more capabilities of the UE for full-duplex communications, the capability information indicates a coherency capability of the UE for the full-duplex mode, the coherency capability of the UE for the full-duplex mode comprising whether the UE supports a fully coherent codebook subset, a partially coherent codebook subset, or a non-coherent codebook subset for the full-duplex mode.

Aspect 3: The method of aspect 2, wherein, to indicate the coherency capability of the UE for the full-duplex mode, the capability information indicates a relationship between the coherency capability of the UE for the full-duplex mode and a coherency capability of the UE for a half-duplex mode.

Aspect 4: The method of aspect 2, wherein the capability information indicates the coherency capability of the UE for the full-duplex mode independently from a coherency capability of the UE for a half-duplex mode.

Aspect 5: The method of any of aspects 1 through 4, wherein to indicate the one or more capabilities of the UE for full-duplex communications, the capability information indicates a maximum quantity of MIMO layers supported by the UE for codebook-based uplink communications in the full-duplex mode, a maximum quantity of MIMO layers supported by the UE for non-codebook-based uplink communications in the full-duplex mode, a maximum quantity of MIMO layers supported by the UE for downlink communications in the full-duplex mode, or any combination thereof.

Aspect 6: The method of any of aspects 1 through 5, wherein, to indicate the one or more capabilities of the UE for full-duplex communications, the capability information indicates a maximum quantity of SRS resources per SRS resource set supported by the UE in the full-duplex mode, a maximum quantity of SRS resources for concurrent SRS transmission by the UE in the full-duplex mode, or any combination thereof.

Aspect 7: The method of any of aspects 1 through 6, further comprising: transmitting, to the network entity via the TDD frequency band, additional capability information that indicates one or more capabilities of the UE associated with operating in a half-duplex mode within the TDD frequency band, wherein a first group of capability indications comprises the capability information associated with operating in the full-duplex mode and a second group of capability indications comprises the additional capability information associated with operating in the half-duplex mode.

Aspect 8: The method of any of aspects 1 through 7, further comprising: transmitting, to the network entity via the TDD frequency band, additional capability information that indicates one or more capabilities of the UE associated with operating in a half-duplex mode within the TDD frequency band, wherein a same group of capability indications comprises the capability information associated with operating in the full-duplex mode and the additional capability information associated with operating in the half-duplex mode.

Aspect 9: The method of any of aspect 8, wherein the group of capability indications is operable to indicate a single value for a capability included in the one or more capabilities of the UE when the capability is identical for the full-duplex mode and the half-duplex mode.

Aspect 10: The method of any of aspects 8 through 9, wherein the group of capability indications is operable to indicate two values for a capability included in the one or more capabilities of the UE when the capability is different for the full-duplex mode than the half-duplex mode.

Aspect 11: The method of any of aspects 1 through 10, wherein the capability information indicates multiple pairs of downlink and uplink capabilities associated with operating in the full-duplex mode, the multiple pairs corresponding to different operating conditions for the UE, each pair of the multiple pairs comprising a respective downlink capability for the UE and a respective uplink capability for the UE associated with a respective operating condition for the UE.

Aspect 12: The method of aspect 11, wherein the capability information indicates, from among the multiple pairs, one pair as a default pair of downlink and uplink capabilities associated with operating in the full-duplex mode.

Aspect 13: The method of any of aspects 1 through 12, wherein the capability information indicates a first pair of downlink and uplink capabilities associated with operating in the full-duplex mode, the first pair comprising a first downlink capability for the UE and a first uplink capability for the UE, the method further comprising: transmitting, based at least in part on detecting a change in capability for the UE, updated capability information that indicates a second pair of downlink and uplink capabilities associated with operating in the full-duplex mode, the second pair comprising a second downlink capability for the UE, a second uplink capability for the UE, or both.

Aspect 14: The method of any of aspects 1 through 13, wherein the one or more capabilities of the UE associated with operating in a full-duplex mode are applicable to an entire serving cell.

Aspect 15: The method of any of aspects 1 through 13, wherein the one or more capabilities of the UE associated with operating in a full-duplex mode are specific to a respective bandwidth part.

Aspect 16: The method of any of aspects 1 through 15, wherein, to indicate a capability included in the one or more capabilities of the UE for full-duplex communications, the capability information indicates a difference between the capability of the UE for full-duplex communications relative to a corresponding capability of the UE for half-duplex communications.

Aspect 17: The method of aspects 1 through 16, wherein, to indicate a capability included in the one or more capabilities of the UE for full-duplex communications, the capability information indicates a first difference between an uplink capability of the UE for full-duplex communications relative to a corresponding uplink capability of the UE for half-duplex communications and further indicates a second difference between a downlink capability of the UE for full-duplex communications relative to a corresponding downlink capability of the UE for half-duplex communications.

Aspect 18: The method of any of aspects 1 through 17, wherein, to indicate the one or more capabilities of the UE for full-duplex communications, the capability information indicates a quantity of antenna panels of the UE that are available for full-duplex communications.

Aspect 19: The method of any of aspect 18, wherein, to indicate the one or more capabilities of the UE for full-duplex communications, the capability information indicates a quantity of antenna panels available for transmission in the full-duplex mode, a quantity of antenna panels available for reception in the full-duplex mode, a respective quantity of transmission chains available for each antenna panel included in the quantity of antenna panels, a respective quantity of reception chains available for each antenna panel included in the quantity of antenna panels, or any combination thereof.

Aspect 20: The method of any of aspects 1 through 19, wherein, to indicate the one or more capabilities of the UE for full-duplex communications, the capability information indicates whether a spatial division multiplexing scheme associated with a half-duplex mode is supported by the UE for the full-duplex mode.

Aspect 21: A method for wireless communications at a network entity, comprising: establishing a connection with a UE for operation within a TDD frequency band; receiving, from the UE via the TDD frequency band, capability information that indicates one or more capabilities of the UE associated with operating in a full-duplex mode within the TDD frequency band; and performing, with the UE, full-duplex communications within the TDD frequency band in accordance with the one or more indicated capabilities, wherein performing the full-duplex communications within the TDD frequency band comprises receiving first signaling within a first subband of the TDD frequency band concurrent with transmitting second signaling within a second subband of the TDD frequency band.

Aspect 22: The method of aspect 21, wherein, to indicate the one or more capabilities of the UE for full-duplex communications, the capability information indicates a coherency capability of the UE for the full-duplex mode, the coherency capability of the UE for the full-duplex mode comprising whether the UE supports a fully coherent codebook subset, a partially coherent codebook subset, or a non-coherent codebook subset for the full-duplex mode.

Aspect 23: The method of aspect 22, wherein, to indicate the coherency capability of the UE for the full-duplex mode, the capability information indicates a relationship between the coherency capability of the UE for the full-duplex mode and a coherency capability of the UE for a half-duplex mode.

Aspect 24: The method of aspect 22, wherein the capability information indicates the coherency capability of the UE for the full-duplex mode independently from a coherency capability of the UE for a half-duplex mode.

Aspect 25: The method of any of aspects 21 through 24, wherein to indicate the one or more capabilities of the UE for full-duplex communications, the capability information indicates a maximum quantity of MIMO layers supported by the UE for codebook-based uplink communications in the full-duplex mode, a maximum quantity of MIMO layers supported by the UE for non-codebook-based uplink communications in the full-duplex mode, a maximum quantity of MIMO layers supported by the UE for downlink communications in the full-duplex mode, or any combination thereof.

Aspect 26: The method of any of aspects 21 through 25, wherein, to indicate the one or more capabilities of the UE for full-duplex communications, the capability information indicates a maximum quantity of SRS resources per SRS resource set supported by the UE in the full-duplex mode, a maximum quantity of SRS resources for concurrent SRS transmission by the UE in the full-duplex mode, or any combination thereof.

Aspect 27: The method of any of aspects 21 through 26, further comprising: receiving, from the UE via the TDD frequency band, additional capability information that indicates one or more capabilities of the UE associated with operating in a half-duplex mode within the TDD frequency band, wherein a first group of capability indications comprises the capability information associated with operating in the full-duplex mode and a second group of capability indications comprises the additional capability information associated with operating in the half-duplex mode.

Aspect 28: The method of any of aspects 21 through 27, further comprising: receiving, from the UE via the TDD frequency band, additional capability information that indicates one or more capabilities of the UE associated with operating in a half-duplex mode within the TDD frequency band, wherein a same group of capability indications comprises the capability information associated with operating in the full-duplex mode and the additional capability information associated with operating in the half-duplex mode.

Aspect 29: The method of any of aspect 28, wherein the group of capability indications is operable to indicate a single value for a capability included in the one or more capabilities of the UE when the capability is identical for the full-duplex mode and the half-duplex mode.

Aspect 30: The method of any of aspects 28 through 29, wherein the group of capability indications is operable to indicate two values for a capability included in the one or more capabilities of the UE when the capability is different for the full-duplex mode than the half-duplex mode.

Aspect 31: The method of any of aspects 21 through 30, wherein the capability information indicates multiple pairs of downlink and uplink capabilities associated with operating in the full-duplex mode, the multiple pairs corresponding to different operating conditions for the UE, each pair of the multiple pairs comprising a respective downlink capability for the UE and a respective uplink capability for the UE associated with a respective operating condition for the UE.

Aspect 32: The method of aspect 31, wherein the capability information indicates, from among the multiple pairs, one pair as a default pair of downlink and uplink capabilities associated with operating in the full-duplex mode.

Aspect 33: The method of any of aspects 21 through 32, wherein the capability information indicates a first pair of downlink and uplink capabilities associated with operating in the full-duplex mode, the first pair comprising a first downlink capability for the UE and a first uplink capability for the UE, the method further comprising: receiving, based at least in part on a change in capability for the UE, updated capability information that indicates a second pair of downlink and uplink capabilities associated with operating in the full-duplex mode, the second pair comprising a second downlink capability for the UE, a second uplink capability for the UE, or both.

Aspect 34: The method of any of aspects 21 through 33, wherein the one or more capabilities of the UE associated with operating in a full-duplex mode are applicable to an entire serving cell.

Aspect 35: The method of any of aspects 21 through 33, wherein the one or more capabilities of the UE associated with operating in a full-duplex mode are specific to a respective bandwidth part.

Aspect 36: The method of any of aspects 21 through 35, wherein, to indicate a capability included in the one or more capabilities of the UE for full-duplex communications, the capability information indicates a difference between the capability of the UE for full-duplex communications relative to a corresponding capability of the UE for half-duplex communications.

Aspect 37: The method of aspects 21 through 36, wherein, to indicate a capability included in the one or more capabilities of the UE for full-duplex communications, the capability information indicates a first difference between an uplink capability of the UE for full-duplex communications relative to a corresponding uplink capability of the UE for half-duplex communications and further indicates a second difference between a downlink capability of the UE for full-duplex communications relative to a corresponding downlink capability of the UE for half-duplex communications.

Aspect 38: The method of any of aspects 21 through 37, wherein, to indicate the one or more capabilities of the UE for full-duplex communications, the capability information indicates a quantity of antenna panels of the UE that are available for full-duplex communications.

Aspect 39: The method of any of aspect 38, wherein, to indicate the one or more capabilities of the UE for full-duplex communications, the capability information indicates a quantity of antenna panels available for transmission in the full-duplex mode, a quantity of antenna panels available for reception in the full-duplex mode, a respective quantity of transmission chains available for each antenna panel included in the quantity of antenna panels, a respective quantity of reception chains available for each antenna panel included in the quantity of antenna panels, or any combination thereof.

Aspect 40: The method of any of aspects 21 through 39, wherein, to indicate the one or more capabilities of the UE for full-duplex communications, the capability information indicates whether a spatial division multiplexing scheme associated with a half-duplex mode is supported by the UE for the full-duplex mode.

Aspect 41: An apparatus for wireless communications at a UE, comprising one or more processors and instructions stored in one or more memories and executable by the one or more processors, individually or collectively, to cause the apparatus to perform a method of any of aspects 1 through 20.

Aspect 42: An apparatus for wireless communications at a UE, comprising at least one means for performing a method of any of aspects 1 through 20.

Aspect 43: A non-transitory computer-readable medium storing code for wireless communications, the code comprising instructions executable by a processor to perform a method of any of aspects 1 through 20.

Aspect 44: An apparatus for wireless communications at a network entity, comprising one or more processors and instructions stored in one or more memories and executable by the one or more processors, individually or collectively, to cause the apparatus to perform a method of any of aspects 21 through 40.

Aspect 45: An apparatus for wireless communications at a network entity, comprising at least one means for performing a method of any of aspects 21 through 40.

Aspect 46: A non-transitory computer-readable medium storing code for wireless communications, the code comprising instructions executable by a processor to perform a method of any of aspects 21 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
  one or more processors; and
  instructions stored in one or more memories and executable by the one or more processors, individually or collectively, to cause the apparatus to:
    establish a connection with a network entity for operation within a time division duplex (TDD) frequency band, the TDD frequency band configured to support half-duplex communications in which uplink communications and downlink communications occur during different time periods;
    transmit, to the network entity via the TDD frequency band, capability information that indicates one or more capabilities of the UE associated with operating in a full-duplex mode within the TDD frequency band; and
    perform, with the network entity, full-duplex communications within the TDD frequency band in accordance with the one or more indicated capabilities, wherein performing the full-duplex communications within the TDD frequency band comprises transmitting first signaling within a first subband of the TDD frequency band concurrent with receiving second signaling within a second subband of the TDD frequency band.

2. The apparatus of claim 1, wherein, to indicate the one or more capabilities of the UE for full-duplex communications, the capability information indicates a coherency capability of the UE for the full-duplex mode, the coherency capability of the UE for the full-duplex mode comprising whether the UE supports a fully coherent codebook subset, a partially coherent codebook subset, or a non-coherent codebook subset for the full-duplex mode.

3. The apparatus of claim 2, wherein, to indicate the coherency capability of the UE for the full-duplex mode, the capability information indicates a relationship between the coherency capability of the UE for the full-duplex mode and a coherency capability of the UE for a half-duplex mode.

4. The apparatus of claim 2, wherein the capability information indicates the coherency capability of the UE for the full-duplex mode independently from a coherency capability of the UE for a half-duplex mode.

5. The apparatus of claim 1, wherein, to indicate the one or more capabilities of the UE for full-duplex communications, the capability information indicates a maximum quantity of multiple-input multiple-output (MIMO) layers supported by the UE for codebook-based uplink communications in the full-duplex mode, a maximum quantity of MIMO layers supported by the UE for non-codebook-based uplink communications in the full-duplex mode, a maximum quantity of MIMO layers supported by the UE for downlink communications in the full-duplex mode, or any combination thereof.

6. The apparatus of claim 1, wherein, to indicate the one or more capabilities of the UE for full-duplex communications, the capability information indicates a maximum quantity of sounding reference signal (SRS) resources per SRS resource set supported by the UE in the full-duplex mode, a maximum quantity of SRS resources for concurrent SRS transmission by the UE in the full-duplex mode, or any combination thereof.

7. The apparatus of claim 1, wherein the instructions are further executable by the one or more processors, individually or collectively, to cause the apparatus to:
  transmit, to the network entity via the TDD frequency band, additional capability information that indicates one or more capabilities of the UE associated with operating in a half-duplex mode within the TDD frequency band, wherein a first group of capability indications comprises the capability information associated with operating in the full-duplex mode and a second group of capability indications comprises the additional capability information associated with operating in the half-duplex mode.

8. The apparatus of claim 1, wherein the instructions are further executable by the one or more processors, individually or collectively, to cause the apparatus to:
  transmit, to the network entity via the TDD frequency band, additional capability information that indicates one or more capabilities of the UE associated with operating in a half-duplex mode within the TDD frequency band, wherein a same group of capability indications comprises the capability information associated with operating in the full-duplex mode and the additional capability information associated with operating in the half-duplex mode.

9. The apparatus of claim 8, wherein the group of capability indications is operable to indicate a single value for a capability included in the one or more capabilities of the UE when the capability is identical for the full-duplex mode and the half-duplex mode.

10. The apparatus of claim 8, wherein the group of capability indications is operable to indicate two values for a capability included in the one or more capabilities of the UE when the capability is different for the full-duplex mode than the half-duplex mode.

11. The apparatus of claim 1, wherein the capability information indicates multiple pairs of downlink and uplink capabilities associated with operating in the full-duplex mode, the multiple pairs corresponding to different operating conditions for the UE, each pair of the multiple pairs comprising a respective downlink capability for the UE and a respective uplink capability for the UE associated with a respective operating condition for the UE.

12. The apparatus of claim 11, wherein the capability information indicates, from among the multiple pairs, one pair as a default pair of downlink and uplink capabilities associated with operating in the full-duplex mode.

13. The apparatus of claim 1, wherein the capability information indicates a first pair of downlink and uplink capabilities associated with operating in the full-duplex mode, the first pair comprising a first downlink capability for the UE and a first uplink capability for the UE, and wherein the instructions are further executable by the one or more processors, individually or collectively, to cause the apparatus to:

transmit, based at least in part on detecting a change in capability for the UE, updated capability information that indicates a second pair of downlink and uplink capabilities associated with operating in the full-duplex mode, the second pair comprising a second downlink capability for the UE, a second uplink capability for the UE, or both.

14. The apparatus of claim 1, wherein the one or more capabilities of the UE associated with operating in a full-duplex mode are applicable to an entire serving cell.

15. The apparatus of claim 1, wherein the one or more capabilities of the UE associated with operating in a full-duplex mode are specific to a respective bandwidth part.

16. The apparatus of claim 1, wherein, to indicate a capability included in the one or more capabilities of the UE for full-duplex communications, the capability information indicates a difference between the capability of the UE for full-duplex communications relative to a corresponding capability of the UE for half-duplex communications.

17. The apparatus of claim 1, wherein, to indicate a capability included in the one or more capabilities of the UE for full-duplex communications, the capability information indicates a first difference between an uplink capability of the UE for full-duplex communications relative to a corresponding uplink capability of the UE for half-duplex communications and further indicates a second difference between a downlink capability of the UE for full-duplex communications relative to a corresponding downlink capability of the UE for half-duplex communications.

18. The apparatus of claim 1, wherein, to indicate the one or more capabilities of the UE for full-duplex communications, the capability information indicates a quantity of antenna panels of the UE that are available for full-duplex communications.

19. The apparatus of claim 18, wherein, to indicate the one or more capabilities of the UE for full-duplex communications, the capability information indicates a quantity of antenna panels available for transmission in the full-duplex mode, a quantity of antenna panels available for reception in the full-duplex mode, a respective quantity of transmission chains available for each antenna panel included in the quantity of antenna panels, a respective quantity of reception chains available for each antenna panel included in the quantity of antenna panels, or any combination thereof.

20. The apparatus of claim 1, wherein, to indicate the one or more capabilities of the UE for full-duplex communications, the capability information indicates whether a spatial division multiplexing scheme associated with a half-duplex mode is supported by the UE for the full-duplex mode.

21. An apparatus for wireless communications at a network entity comprising:

one or more processors; and instructions stored in one or more memories and executable by the one or more processors, individually or collectively, to cause the apparatus to:

establish a connection with a user equipment (UE) for operation within a time division duplex (TDD) frequency band, the TDD frequency band configured to support half-duplex communications in which uplink communications and downlink communications occur during different time periods;

receive, from the UE via the TDD frequency band, capability information that indicates one or more capabilities of the UE associated with operating in a full-duplex mode within the TDD frequency band; and perform, with the UE, full-duplex communications within the TDD frequency band in accordance with the one or more indicated capabilities, wherein performing the full-duplex communications within the TDD frequency band comprises receiving first signaling within a first subband of the TDD frequency band concurrent with transmitting second signaling within a second subband of the TDD frequency band.

22. The network entity of claim 21, wherein, to indicate the one or more capabilities of the UE for full-duplex communications, the capability information indicates a coherency capability of the UE for the full-duplex mode, the coherency capability of the UE for the full-duplex mode comprising whether the UE supports a fully coherent codebook subset, a partially coherent codebook subset, or a non-coherent codebook subset for the full-duplex mode.

23. The network entity of claim 21, wherein, to indicate the one or more capabilities of the UE for full-duplex communications, the capability information indicates a maximum quantity of multiple-input multiple-output (MIMO) layers supported by the UE for codebook-based uplink communications in the full-duplex mode, a maximum quantity of MIMO layers supported by the UE for non-codebook-based uplink communications in the full-duplex mode, a maximum quantity of MIMO layers supported by the UE for downlink communications in the full-duplex mode, or any combination thereof.

24. The network entity of claim 21, wherein, to indicate the one or more capabilities of the UE for full-duplex communications, the capability information indicates a maximum quantity of sounding reference signal (SRS) resources per SRS resource set supported by the UE in the full-duplex mode, a maximum quantity of SRS resources for concurrent SRS transmission by the UE in the full-duplex mode, or any combination thereof.

25. The network entity of claim 21, wherein the instructions are further executable by the one or more processors, individually or collectively, to cause the apparatus to:

receive, from the UE via the TDD frequency band, additional capability information that indicates one or more capabilities of the UE associated with operating in a half-duplex mode within the TDD frequency band, wherein a first group of capability indications comprises the capability information associated with operating in the full-duplex mode and a second group of capability indications comprises the additional capability information associated with operating in the half-duplex mode.

26. The network entity of claim 21, wherein the instructions are further executable by the one or more processors, individually or collectively, to cause the apparatus to:

receive, from the UE via the TDD frequency band, additional capability information that indicates one or more capabilities of the UE associated with operating in a half-duplex mode within the TDD frequency band, wherein a same group of capability indications comprises the capability information associated with operating in the full-duplex mode and the additional capability information associated with operating in the half-duplex mode.

27. The network entity of claim 21, wherein the capability information indicates multiple pairs of downlink and uplink capabilities associated with operating in the full-duplex mode, the multiple pairs corresponding to different operating conditions for the UE, each pair of the multiple pairs comprising a respective downlink capability for the UE and a respective uplink capability for the UE associated with a respective operating condition for the UE.

28. The network entity of claim 21, wherein the capability information indicates a first pair of downlink and uplink capabilities associated with operating in the full-duplex mode, the first pair comprising a first downlink capability for the UE and a first uplink capability for the UE, and wherein the instructions are further executable by the one or more processors, individually or collectively, to cause the apparatus to:

receive, based at least in part on a change in capability for the UE, updated capability information that indicates a second pair of downlink and uplink capabilities associated with operating in the full-duplex mode, the second pair comprising a second downlink capability for the UE, a second uplink capability for the UE, or both.

29. A method for wireless communications at a user equipment (UE), comprising:

establishing a connection with a network entity for operation within a time division duplex (TDD) frequency band, the TDD frequency band configured to support half-duplex communications in which uplink communications and downlink communications occur during different time periods;

transmitting, to the network entity via the TDD frequency band, capability information that indicates one or more capabilities of the UE associated with operating in a full-duplex mode within the TDD frequency band; and performing, with the network entity, full-duplex communications within the TDD frequency band in accordance with the one or more indicated capabilities, wherein performing the full-duplex communications within the TDD frequency band comprises transmitting first signaling within a first subband of the TDD frequency band concurrent with receiving second signaling within a second subband of the TDD frequency band.

30. A method for wireless communications at a network entity, comprising:

establishing a connection with a user equipment (UE) for operation within a time division duplex (TDD) frequency band, the TDD frequency band configured to support half-duplex communications in which uplink communications and downlink communications occur during different time periods;

receiving, from the UE via the TDD frequency band, capability information that indicates one or more capabilities of the UE associated with operating in a full-duplex mode within the TDD frequency band; and performing, with the UE, full-duplex communications within the TDD frequency band in accordance with the one or more indicated capabilities, wherein performing the full-duplex communications within the TDD frequency band comprises receiving first signaling within a first subband of the TDD frequency band concurrent with transmitting second signaling within a second subband of the TDD frequency band.

* * * * *